(12) United States Patent
Yano et al.

(10) Patent No.: US 11,240,805 B2
(45) Date of Patent: *Feb. 1, 2022

(54) RADIO COMMUNICATION METHOD, TERMINAL, AND BASE STATION

(71) Applicant: FUJITSU LIMITED, Kawasaki (JP)

(72) Inventors: Tetsuya Yano, Yokohama (JP); Yoshiaki Ohta, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,978

(22) Filed: Dec. 17, 2019

(65) Prior Publication Data

US 2020/0128544 A1 Apr. 23, 2020

Related U.S. Application Data

(63) Continuation of application No. 16/042,228, filed on Jul. 23, 2018, now Pat. No. 10,887,880, which is a (Continued)

(51) Int. Cl.
*H04W 72/04* (2009.01)
*H04L 1/00* (2006.01)
(Continued)

(52) U.S. Cl.
CPC .......... *H04W 72/0453* (2013.01); *H04L 1/00* (2013.01); *H04L 27/00* (2013.01);
(Continued)

(58) Field of Classification Search
CPC ......... H04L 1/00; H04L 27/00; H04L 1/0025; H04L 1/0061; H04L 5/001; H04L 5/0044;
(Continued)

(56) References Cited

U.S. PATENT DOCUMENTS 9,974,097 B2 * 5/2018 Seo .................. H04B 7/0623
10,064,182 B2 8/2018 Yano et al.
(Continued)

FOREIGN PATENT DOCUMENTS

JP 2011-517889 A 6/2011
JP 2012-5074 A 1/2012
(Continued)

OTHER PUBLICATIONS

3GPP TS 36.212 V11.2.0, "3rd Generation Partnership Project; Technical Specification Group Radio Access Network; Evolved Universal Terrestrial Radio Access (E-UTRA); Multiplexing and channel coding (Release 11)", Feb. 2013.
(Continued)

*Primary Examiner* — Chi H Pham
*Assistant Examiner* — Weibin Huang
(74) *Attorney, Agent, or Firm* — Myers Wolin, LLC

(57) ABSTRACT

A wireless communication system includes: a transmitting apparatus to transmit using one or more of radio resources; and a receiving apparatus to store correspondence information indicating a correspondence between a resource amount and a data size, the transmitting apparatus transmits to the receiving apparatus, data mapped to the radio resources, where the transmitting apparatus transmits a single control signal associated with the data to be transmitted across a plurality of time resource, the transmitting apparatus transmits a single control signal associated with the data transmitted across a plurality of frequency resources, the single control signal includes information indicating a value based on a number of the plurality of time resources, a number of the plurality of frequency resources, or information indicating a first resource amount wherein the receiving apparatus acquires a first data size being dependent on the value, the
(Continued)

first resource amount, and correspondence information, and decode the data.

4 Claims, 20 Drawing Sheets

Related U.S. Application Data continuation of application No. 14/853,241, filed on Sep. 14, 2015, now Pat. No. 10,064,182, which is a continuation of application No. PCT/JP2013/001978, filed on Mar. 22, 2013.

(51) Int. Cl.
*H04L 27/00* (2006.01)
*H04L 5/00* (2006.01)
*H04W 88/02* (2009.01)
*H04W 88/08* (2009.01)

(52) U.S. Cl.
CPC ....... *H04W 72/0406* (2013.01); *H04L 1/0025* (2013.01); *H04L 1/0061* (2013.01); *H04L 5/001* (2013.01); *H04L 5/0044* (2013.01); *H04L 5/0092* (2013.01); *H04W 88/02* (2013.01); *H04W 88/08* (2013.01)

(58) Field of Classification Search
CPC .......................... H04L 5/0092; H04W 72/0406; H04W 88/02; H04W 88/08; H04W 72/0453
See application file for complete search history.

(56) References Cited

U.S. PATENT DOCUMENTS

| | | | |
|---|---|---|---|
| 2010/0027446 A1* | 2/2010 | Choi ..................... | H04L 5/0053 370/280 |
| 2010/0195614 A1* | 8/2010 | Nimbalker ............ | H04L 1/0025 370/330 |
| 2010/0309867 A1 | 12/2010 | Palanki et al. | |
| 2011/0064037 A1 | 3/2011 | Wei et al. | |
| 2011/0085508 A1 | 4/2011 | Wengerter et al. | |
| 2011/0105050 A1 | 5/2011 | Khandekar et al. | |
| 2011/0128931 A1* | 6/2011 | Ishii ..................... | G09G 3/3614 370/329 |
| 2011/0134871 A1 | 6/2011 | Nogami et al. | |
| 2011/0141996 A1 | 6/2011 | Yamada et al. | |
| 2011/0243034 A1 | 10/2011 | Yamada et al. | |
| 2011/0274060 A1 | 11/2011 | Luo et al. | |
| 2011/0274064 A1 | 11/2011 | Luo et al. | |
| 2012/0120880 A1* | 5/2012 | Lee ..................... | H04W 72/02 370/329 |
| 2012/0127938 A1 | 5/2012 | Lv et al. | |
| 2013/0107836 A1 | 5/2013 | Miki et al. | |
| 2013/0223402 A1* | 8/2013 | Feng ................. | H04W 72/0446 370/330 |
| 2013/0242912 A1* | 9/2013 | Wu ........................ | H04W 4/70 370/329 |
| 2014/0254509 A1* | 9/2014 | Chen .................... | H04L 5/0058 370/329 |
| 2015/0223232 A1* | 8/2015 | Eriksson ........... | H04W 72/0446 370/329 |

FOREIGN PATENT DOCUMENTS

| | | |
|---|---|---|
| JP | 2012-60539 A | 3/2012 |
| JP | 2012-130070 A | 7/2012 |
| JP | 2012-138968 A | 7/2012 |
| JP | 2012-165439 A | 8/2012 |

OTHER PUBLICATIONS

3GPP TS 36.213 V11.2.0, "3rd Generation Partnership Project; Technical Specification Group Radio Access Network; Evolved Universal Terrestrial Radio Access (E-UTRA); Physical layer procedures (Release 11)", Feb. 2013.
International Search Report issued for corresponding International Patent Application No. PCT/JP2013/001978, dated Apr. 16, 2013, with an English translation.
Change Request, CMCC et al., "Draft CR on TBS scaling factor for special subframe configuration 9 with normal cyclic prefix and special subframe configuration 7 with extended cyclic prefix", 3GPP TSG-RAN WG1 Meeting #69, R1-122716, Prague, Czech Republic, May 21-25, 2012.
Change Request, CMCC et al., "36.213 CR0380R3 (Rel-11, B) CR for Additional special subframe", 3GPP TSG-RAN WG1 Meeting #70, R1-124823, Qingdao, China, Aug. 13-17, 2012.
ZTE, "Discussion on TBS scaling factor for additional TDD special subframe configurations", Agenda Item: 7.7.1, 3GPP TSG-RAN WG1 Meeting #69, R1-122116, Prague, Czech Republic, May 21-25, 2012.
Non-Final Office Action issued by the United States Patent and Trademark Office for corresponding U.S. Appl. No. 14/853,241, dated Apr. 4, 2017.
Final Office Action issued by the United States Patent and Trademark Office for corresponding U.S. Appl. No. 14/853,241, dated Jul. 17, 2017.
Non-Final Office Action issued by the United States Patent and Trademark Office for corresponding U.S. Appl. No. 16/042,228, dated Sep. 18, 2019.
Non-Final Office Action issued by the United States Patent and Trademark Office for corresponding U.S. Appl. No. 16/042,228, dated Jul. 23, 2020.

\* cited by examiner

FIG. 3

DIMENSIONS 27×110

| $I_{TBS}$ | 1 | 2 | 3 | 4 | 5 | 6 | 7 | 8 | 9 | 10 | ... | 109 | 110 |
|---|---|---|---|---|---|---|---|---|---|---|---|---|---|
| 0 | 16 | 32 | 56 | 88 | 120 | 152 | 176 | 208 | 224 | 256 | ... | 2984 | 3112 |
| 1 | 24 | 56 | 88 | 144 | 176 | 208 | 224 | 256 | 328 | 344 | ... | 4008 | 4008 |
| 2 | 32 | 72 | 144 | 176 | 208 | 256 | 296 | 328 | 376 | 424 | ... | 4968 | 4968 |
| 3 | 40 | 104 | 176 | 208 | 256 | 328 | 392 | 440 | 504 | 568 | ... | 6456 | 6456 |
| 4 | 56 | 120 | 208 | 256 | 328 | 408 | 488 | 552 | 632 | 696 | ... | 7736 | 7992 |
| 5 | 72 | 144 | 224 | 328 | 424 | 504 | 600 | 680 | 776 | 872 | ... | 9528 | 9528 |
| 6 | 328 | 176 | 256 | 392 | 504 | 600 | 712 | 808 | 936 | 1032 | ... | 11448 | 11448 |
| 7 | 104 | 224 | 328 | 472 | 584 | 712 | 840 | 968 | 1096 | 1224 | ... | 13536 | 13536 |
| 8 | 120 | 256 | 392 | 536 | 680 | 808 | 968 | 1096 | 1256 | 1384 | ... | 15264 | 15264 |
| 9 | 136 | 296 | 456 | 616 | 776 | 936 | 1096 | 1256 | 1416 | 1544 | ... | 16992 | 17568 |
| 10 | 144 | 328 | 504 | 680 | 872 | 1032 | 1224 | 1384 | 1544 | 1736 | ... | 19080 | 19080 |
| 11 | 176 | 376 | 584 | 776 | 1000 | 1192 | 1384 | 1608 | 1800 | 2024 | ... | 22152 | 22152 |
| 12 | 208 | 440 | 680 | 904 | 1128 | 1352 | 1608 | 1800 | 2024 | 2280 | ... | 24496 | 25456 |
| 13 | 224 | 488 | 744 | 1000 | 1256 | 1544 | 1800 | 2024 | 2280 | 2536 | ... | 28336 | 28336 |
| 14 | 256 | 552 | 840 | 1128 | 1416 | 1736 | 1992 | 2280 | 2600 | 2856 | ... | 31704 | 31704 |
| 15 | 280 | 600 | 904 | 1224 | 1544 | 1800 | 2152 | 2472 | 2728 | 3112 | ... | 34008 | 34008 |
| ... | ... | ... | ... | ... | ... | ... | ... | ... | ... | ... | ... | ... | ... |
| 25 | 616 | 1256 | 1864 | 2536 | 3112 | 3752 | 4392 | 5160 | 5736 | 6200 | ... | 68808 | 71112 |
| 26 | 712 | 1480 | 2216 | 2984 | 3752 | 4392 | 5160 | 5992 | 6712 | 7480 | ... | 75376 | 75376 |

FIG. 5

| Carrier indicator field (CIF) |
|---|
| Resource allocation header |
| Resource block assignment (RB assignment) |
| Modulation and coding scheme (MCS) |
| HARQ process number |
| New data indicator |
| Redundancy version |
| TPC command for PUCCH |

FIG. 6

| MCS Index $I_{MCS}$ | Modulation Order $O_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

FIG. 10

DIMENSIONS 27 × 214

| $I_{TBS}$ | $N_{PRB}$ 111 | 112 | 114 | 115 | 116 | 117 | 118 | 120 | 122 | 123 | ... | 545 | 550 |
|---|---|---|---|---|---|---|---|---|---|---|---|---|---|
| 0 | 3112 | 3136 | 3240 | ... | ... | ... | ... | ... | ... | ... | ... | ... | ... |
| 1 | 4008 | 4100 | 4136 | ... | ... | ... | ... | ... | ... | ... | ... | ... | ... |
| 2 | 4968 | 4992 | 5160 | ... | ... | ... | ... | ... | ... | ... | ... | ... | ... |
| 3 | 6456 | 3264 | 6712 | ... | ... | ... | ... | ... | ... | ... | ... | ... | ... |
| 4 | 7992 | 4032 | 8248 | ... | ... | ... | ... | ... | ... | ... | ... | ... | ... |
| 5 | 9912 | 4992 | 10296 | ... | ... | ... | ... | ... | ... | ... | ... | ... | ... |
| 6 | 11832 | 5952 | 11832 | ... | ... | ... | ... | ... | ... | ... | ... | ... | ... |
| 7 | 13536 | 4544 | 14112 | ... | ... | ... | ... | ... | ... | ... | ... | ... | ... |
| 8 | 15840 | 5312 | 15840 | ... | ... | ... | ... | ... | ... | ... | ... | ... | ... |
| 9 | 17568 | 5888 | 18144 | ... | ... | ... | ... | ... | ... | ... | ... | ... | ... |
| 10 | 19848 | 4992 | 19848 | ... | ... | ... | ... | ... | ... | ... | ... | ... | ... |
| 11 | 22920 | 5760 | 22920 | ... | ... | ... | ... | ... | ... | ... | ... | ... | ... |
| 12 | 25456 | 5120 | 26416 | ... | ... | ... | ... | ... | ... | ... | ... | ... | ... |
| 13 | 28336 | 5696 | 28296 | ... | ... | ... | ... | ... | ... | ... | ... | ... | ... |
| 14 | 31704 | 5312 | 32856 | ... | ... | ... | ... | ... | ... | ... | ... | ... | ... |
| 15 | 34008 | 5696 | 35160 | ... | ... | ... | ... | ... | ... | ... | ... | ... | ... |
| ... | ... | ... | ... | ... | ... | ... | ... | ... | ... | ... | ... | ... | ... |
| 25 | 71112 | 5952 | 73416 | ... | ... | ... | ... | ... | ... | ... | ... | ... | ... |
| 26 | 77040 | 5952 | 77040 | ... | ... | ... | ... | ... | ... | ... | ... | ... | ... |

FIG. 11

DIMENSIONS 27 × 614

| $I_{TBS}$ | $N_{PRB}$ | | | | | | | | | | | | | | | | | |
|---|---|---|---|---|---|---|---|---|---|---|---|---|---|---|---|---|---|---|
| | 111 | 112 | 114 | 115 | 116 | 117 | 118 | 120 | 122 | 123 | ... | 2725 | 2730 |
| 0 | 3112 | 3136 | 3240 | ... | ... | ... | ... | ... | ... | ... | ... | ... | ... |
| 1 | 4008 | 4160 | 4136 | ... | ... | ... | ... | ... | ... | ... | ... | ... | ... |
| 2 | 4968 | 4968 | 5160 | ... | ... | ... | ... | ... | ... | ... | ... | ... | ... |
| 3 | 6456 | 3264 | 6712 | ... | ... | ... | ... | ... | ... | ... | ... | ... | ... |
| 4 | 7992 | 4032 | 8248 | ... | ... | ... | ... | ... | ... | ... | ... | ... | ... |
| 5 | 8912 | 4968 | 10296 | ... | ... | ... | ... | ... | ... | ... | ... | ... | ... |
| 6 | 11832 | 5352 | 11832 | ... | ... | ... | ... | ... | ... | ... | ... | ... | ... |
| 7 | 13536 | 4544 | 14112 | ... | ... | ... | ... | ... | ... | ... | ... | ... | ... |
| 8 | 15840 | 5312 | 15840 | ... | ... | ... | ... | ... | ... | ... | ... | ... | ... |
| 9 | 17568 | 5088 | 18144 | ... | ... | ... | ... | ... | ... | ... | ... | ... | ... |
| 10 | 19848 | 4992 | 19848 | ... | ... | ... | ... | ... | ... | ... | ... | ... | ... |
| 11 | 22920 | 5760 | 22920 | ... | ... | ... | ... | ... | ... | ... | ... | ... | ... |
| 12 | 25456 | 5120 | 26416 | ... | ... | ... | ... | ... | ... | ... | ... | ... | ... |
| 13 | 28336 | 5696 | 29296 | ... | ... | ... | ... | ... | ... | ... | ... | ... | ... |
| 14 | 31704 | 5312 | 32856 | ... | ... | ... | ... | ... | ... | ... | ... | ... | ... |
| 15 | 34008 | 5696 | 35160 | ... | ... | ... | ... | ... | ... | ... | ... | ... | ... |
| ... | ... | ... | ... | ... | ... | ... | ... | ... | ... | ... | ... | ... | ... |
| 25 | 71112 | 5952 | 73416 | ... | ... | ... | ... | ... | ... | ... | ... | ... | ... |
| 26 | 77040 | 5952 | 77040 | ... | ... | ... | ... | ... | ... | ... | ... | ... | ... |

RADIO COMMUNICATION METHOD, TERMINAL, AND BASE STATION

CROSS-REFERENCE TO RELATED APPLICATION

This application is a continuation of U.S. application Ser. No. 16/042,228, filed Jul. 23, 2018, which is a continuation of U.S. application Ser. No. 14/853,241, filed Sep. 14, 2015, now U.S. Pat. No. 10,064,182 issued Aug. 28, 2018, which is a continuation application of the International Application PCT/JP2013/001978, filed on Mar. 22, 2013 and designated the U.S., the entire contents of each are incorporated herein by reference.

FIELD

The embodiments discussed herein are related to a radio communication system, a radio communication method, a receiving device, and a transmitting device.

BACKGROUND

In recent years, in order to increase radio communication rates and capacities in radio communication systems such as mobile phone systems (cellular systems), a next-generation radio communication technique has been discussed. For example, in the 3rd Generation Partnership Project (3GPP) that is a standards body, the communication standard that is referred to as Long Term Evolution (LTE) and the communication standard that is referred to as LTE-Advanced (LTE-A) based on the radio communication technique for LTE have been proposed.

The latest communication standard completed by the 3GPP is Release 10 supporting LTE-A. Release 10 is the communication standard completed by significantly expanding the functions of Release 8 and 9 supporting LTE. The discussion of main parts of Release 11 to be completed by expanding Release 10 was concluded and Release 11 is under discussion for the completion of Release 11. In addition, the discussion of Release 12 has been started. Hereinafter, unless otherwise noted, "LTE" includes LTE, LTE-A, and other radio communication systems obtained by expanding LTE and LTE-A.

For LTE and LTE-A, many various techniques have been proposed, discussions have been held based on the proposals, and the communication standards will be expanded. In the discussions, many techniques were not adopted for some reasons regardless of having been proposed, and many techniques were decided to be discussed in the future based on relationships between priorities.

One of the techniques is multi-subframe scheduling. Since multi-subframe scheduling is a form of cross-subframe scheduling, cross-subframe scheduling is described below.

In downlink data communication (in a direction from a radio base station to a radio terminal) in a general LTE system, a subframe in which data is transmitted is the same as a subframe in which control information accompanied with the data and provided for scheduling or the like is transmitted. On the other hand, if cross-subframe scheduling is introduced, a subframe in which data is transmitted may be different from a subframe in which control information accompanied with the data and provided for scheduling or the like is transmitted. Each of the subframes is obtained by dividing a radio frame including a frequency and a time by a time period. In the LTE system, each of the subframes has a length of 1 millisecond.

Since cross-subframe scheduling is not limited to a constraint in which control information and data are transmitted in the same subframe in a conventional technique, flexible scheduling may be achieved. For example, a region (radio resource) in which control information may be set and that is included in a subframe is limited in the LTE system. If a large number of data items are to be transmitted (for example, if a large number of data items with small amounts are to be transmitted), a region for a control signal may not be available. If it is expected that a large number of data items are to be transmitted, and a part of control information for the data items is transmitted in a subframe that is different from the data items, it is possible to transmit the larger number of data items and avoid the fact that the region for the control signal is not available.

Next, the aforementioned multi-subframe scheduling is described. If multi-subframe scheduling is introduced, one or multiple data items to be transmitted in multiple subframes may be controlled based on a single control information item. A subframe in which control information is transmitted may be any of subframes in which data is transmitted or may be different from the subframes in which the data is transmitted. In both cases, in multi-subframe scheduling, at least one of the subframes in which the data is transmitted is different from the subframe in which the control information is transmitted, and cross-subframe scheduling is inevitably executed. Thus, it may be said that multi-subframe scheduling is a form of cross-subframe scheduling.

Multi-subframe scheduling provides an effect obtained by cross-subframe scheduling and an effect of reducing the amount of a control signal. The reason is that, in multi-subframe scheduling, a single control signal may be used for one or multiple data items in multiple subframes. As described above, the region for the control signal is limited. Thus, a reduction in the amount of the control signal is considered as an important issue. In addition, if the amount of the control signal is large, the number of radio resources for data transmission is reduced and it is difficult to achieve a high throughput. Thus, it may be said that there has been an increasing demand to reduce the amount of the control signal in recent years.

On the other hand, in LTE-A, a technique that is referred to as carrier aggregation is introduced. Carrier aggregation is a technique for transmitting and receiving multiple carriers (frequency bands) in parallel. Carrier aggregation is known as one of element techniques that achieve a high throughput in radio communication. For example, if two carriers of the same frequency bandwidth are used in parallel, the throughput may be doubled, compared with a case where one carrier is used.

Some scheduling methods for carrier aggregation are known, and one of the scheduling methods is multi-carrier scheduling. Multi-carrier scheduling is a form of cross-carrier scheduling. Thus, cross-carrier scheduling is described below.

If carrier aggregation is executed, data and a control signal accompanied with the data and provided for scheduling or the like may be transmitted on the same carrier for each of multiple carriers. On the other hand, a method of using a single carrier selected from among multiple carriers to transmit control information for data items that are each to be transmitted on any of the carriers has been proposed. The method in which a carrier to be used to transmit data is different from a carrier to be used to transmit a control signal accompanied with the data and provided for scheduling or the like is referred to as cross-carrier scheduling. A radio terminal monitors a downlink control signal in order to detect the transmission of data whose destination is the interested radio terminal. Thus, if the control signal is transmitted on multiple carriers, a load applied due to the monitoring is large and the monitoring is inconvenient. In order to avoid this problem with carrier aggregation, it is considered to be effective to set the number of carriers to be monitored by cross-carrier scheduling to one or reduce the number of carriers to be monitored by cross-carrier scheduling.

Next, the aforementioned multi-carrier scheduling is described. If multi-carrier scheduling is introduced, one or multiple data items to be transmitted on multiple carriers may be controlled by one control information item. A carrier for transmitting the control information item may be any of the carriers for transmitting the data items or may be a carrier different from the carriers for transmitting the data items. In both cases, in multi-carrier scheduling, since at least one of the carriers for transmitting the data items is different from the carrier for transmitting the control information item, cross-carrier scheduling is inevitably executed. Thus, it may be said that multi-carrier scheduling is a form of cross-carrier scheduling.

Multi-carrier scheduling provides an effect obtained by cross-carrier scheduling and an effect of reducing the amount of a control signal. The reason is that, in multi-carrier scheduling, a single control signal may be used for one or multiple data items on multiple carriers. As described above, the region for the control signal is limited. Thus, a reduction in the amount of the control signal is considered as an important issue. In addition, if the amount of the control signal is large, the number of radio resources for data transmission is reduced and it is difficult to achieve a high throughput. Thus, it may be said that there has been an increasing demand to reduce the amount of the control signal in recent years.

Multi-subframe scheduling and multi-carrier scheduling are described above. It may be said that multi-subframe scheduling and multi-carrier scheduling are scheduling methods using only one control signal for scheduling or the like for one or multiple data items to be transmitted by multiple radio resources (subframes and carriers).

In this specification, multi-subframe scheduling and multi-carrier scheduling are collectively referred to as "multi-subframe scheduling and the like" in some cases. In addition, multiple subframes and multiple carriers are collectively referred to as "multiple subframes and the like" in some cases. Since subframes and carriers are radio resources, a subframe and a carrier are collectively referred to as a "radio resource" in some cases, and multiple subframes and multiple carriers are collectively referred to as "multiple radio resources" in some cases. A single subframe of a single carrier is a unit of a radio resource in multi-subframe scheduling and the like and is thus referred to as a unit radio source in some cases.

Examples of related art are Japanese Laid-open Patent Publications Nos. 2012-60539, 2012-165439, 2012-130070, 2012-138968, and 2012-5074, Japanese National Publication of International Patent Application No. 2011-517889, U.S. Patent Application Publications Nos. 2012/0127938, 2010/0309867, 2011/0064037, 2011/0105050, 2011/0274060, and 2011/0274064, and Non-Patent Documents "3GPP TS36. 212 V11.1.0 (2012-12-20)" and "3GPP TS36. 213 V11.1.0 (2012-12-20)".

SUMMARY

According to an aspect of the invention, a radio communication method includes storing each of a plurality of associations between each resource size and each data size by a terminal, each data size indicating each size of data capable of being transmitted using an associated resource size, receiving specified data, first control information, and second control information from a base station by the terminal, the specified data being mapped across a plurality of radio resources, each of the plurality of radio resources having each specified frequency bandwidth and each specified time period, the first control information indicating the number of the plurality of radio resources, the second control information indicating an individual resource size allocated for the specified data in each of the plurality of radio resources, obtaining a total data size of the specified data by the terminal based on the first control information, the second control information, and the plurality of associations, and decoding the specified data by the terminal based on the total data size of the specified data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating the concept of multi-subframe scheduling and the like;

FIG. 3 is a diagram illustrating a TBS translation table defined in the 3GPP standard specifications;

FIG. 5 is a diagram illustrating details of DCI format 1 defined in the 3GPP standard specifications;

FIG. 6 is a diagram illustrating an MCS translation table defined in the 3GPP standard specifications;

FIG. 10 is a diagram illustrating an example of a TBS translation table according to a fourth embodiment;

FIG. 11 is a diagram illustrating another example of the TBS translation table according to the fourth embodiment;

DESCRIPTION OF EMBODIMENTS

As described above, some proposals for multi-subframe scheduling and the like have been provided in the 3GPP, but are yet to be deeply discussed due to priorities of the proposals to be discussed. Thus, if multi-subframe scheduling and the like are introduced in an LTE system or the like, it is considered that an unknown problem or inconvenience may occur.

The techniques disclosed herein have been devised under such circumstances and it is an object of the techniques disclosed herein to provide a radio communication system, a radio communication method, a receiving device, and a transmitting device that solve potential problems with multi-subframe scheduling and the like.

Embodiments of the radio communication system, the radio communication method, the receiving device, and the transmitting device that are disclosed herein are described with reference to the accompanying drawings. Although the separate embodiments are described for the sake of convenience, it goes without saying that at least two of the embodiments may be combined so as to provide an effect of the combination and further improve the usability of the combination.

Problems

Before the embodiments are described, problems with conventional techniques are described below. The inventors newly found the problems as a result of studying the conventional techniques in detail, and it is to be noted that the problems had not traditionally been known.

A case where multi-subframe scheduling and the like are applied to downlink data transmission (in a direction from a radio base station to a radio terminal) in an LTE system is described below as an example. However, it is to be noted that the same applies to a case where multi-subframe scheduling and the like are applied to uplink data transmission (in a direction from the radio terminal to the radio base station) in the LTE system and a case where multi-subframe scheduling and the like are applied to a radio communication system other than the LTE system.

As described above, multi-subframe scheduling and the like are scheduling methods in which only one control signal for scheduling or the like is used for one or multiple data items to be transmitted by multiple radio resources (subframes and carriers). In the LTE system, a downlink data item is transmitted through a physical downlink shared channel (PDSCH), and a downlink control signal is transmitted through a physical downlink control channel (PDCCH). Thus, it may be said that multi-subframe scheduling and the like to be executed for downlink data transmission in LTE are scheduling methods in which only one PDCCH is used for one or multiple PDSCHs through which one or multiple data items are transmitted by multiple radio resources (subframes and carriers).

Figure 1:
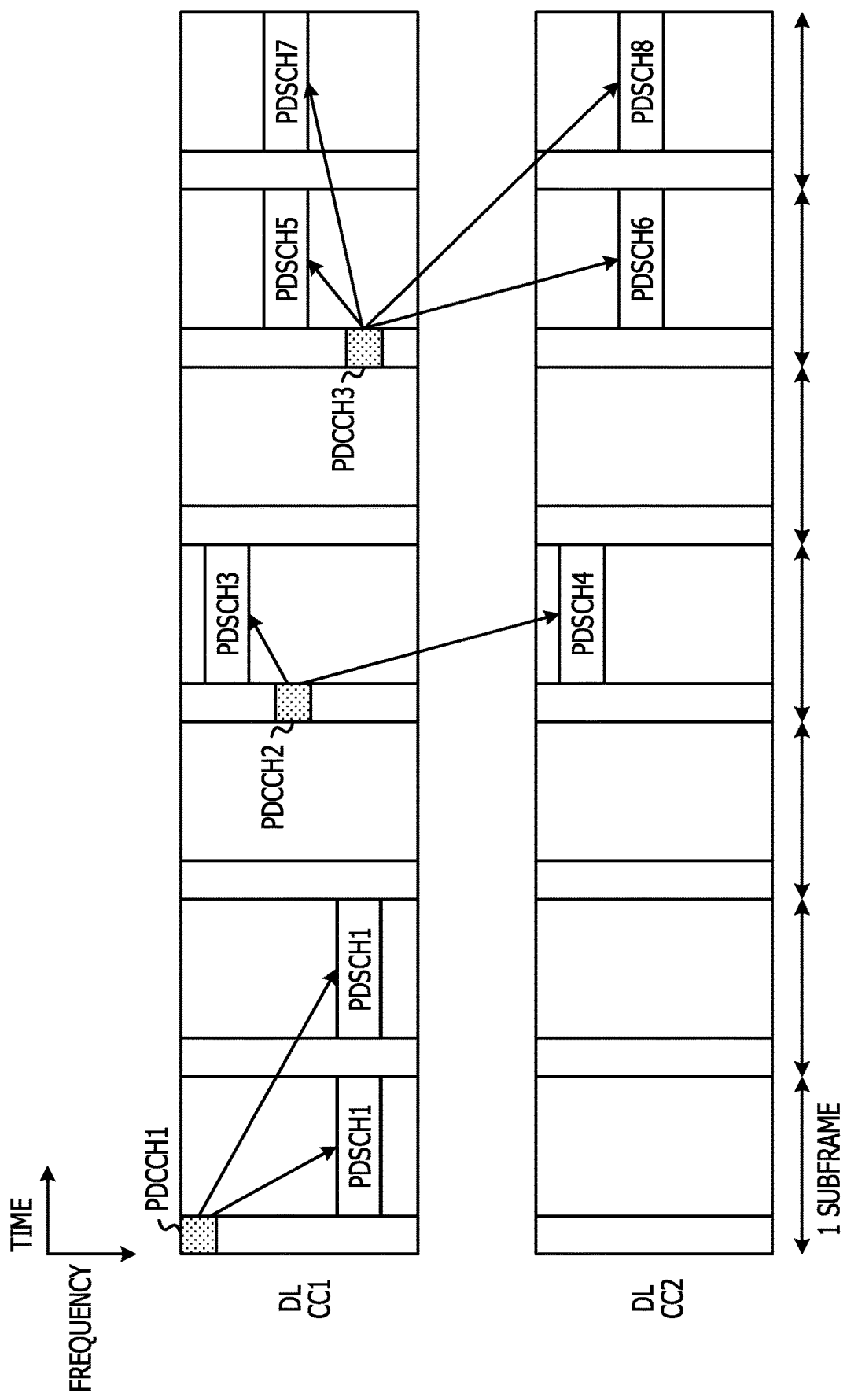

FIG. 1 is a conceptual diagram describing multi-subframe scheduling and the like in the LTE system. In the LTE system, a control signal region is allocated at the beginning of each subframe, and a remaining region of each subframe is a data signal region. Each PDCCH to which control information is mapped is allocated to a respective control signal region, while each PDSCH to which data is mapped is allocated to a respective data signal region. In an example illustrated in FIG. 1, two downlink carriers CC1 and CC2 are illustrated.

Each PDCCH illustrated in FIG. 1 is used to execute multi-subframe scheduling and the like to schedule PDSCHs. Specifically, a PDCCH 1 is used to execute multi-subframe scheduling to schedule PDSCHs 1 and 2 in two subframes. In addition, a PDCCH 2 is used to execute multi-carrier scheduling to schedule PDSCHs 3 and 4 on two carriers. Furthermore, a PDCCH 3 is used to execute multi-subframe scheduling and multi-carrier scheduling to schedule PDSCHs 5, 6, 7, and 8 in two subframes on two carriers.

This specification temporarily deviates from the description about multi-subframe scheduling and the like, and transport blocks (TBs) to be used in the LTE system are described below. In the conventional LTE system, each transport block corresponds to a respective PDSCH. The transport blocks are data blocks corresponding to data packets in a higher-level layer. In addition, the transport blocks are units to be processed for hybrid automatic repeat request (HARQ) adopted in the LTE system. Specifically, a receiver decodes data per transport block unit and transmits, based on the result of the decoding, an ACK signal indicating the success of the decoding or a NACK signal indicating the failure of the decoding to a transmitter for each transport block. In the following description, a transport block may be interpreted as data (downlink data if downlink data transmission is executed).

A process of transmitting a transport block (downlink data) by a radio base station (transmitter) of the LTE system is described below. The radio base station adds a cyclic redundancy check (CRC) of 24 bits to the transport block. Then, the radio base station uses a turbo code to encode the transport block having the CRC added thereto. In this case, if the size of the transport block having the CRC added thereto exceeds 6144 bits, the transport block having the CRC added thereto is divided and encoded. The division is executed based on a limit on the size of data to be input to an interleaver included in a turbo encoder in the LTE system. Precisely speaking, the data to be input to the turbo encoder is referred to as a code block. If the transport block having the CRC added thereto is not divided, the transport block is treated as a code block. If the transport block having the CRC added thereto is divided into blocks, the divided blocks are treated as code blocks.

The transport block (downlink data) having the CRC added thereto is increased in size by three times by the turbo encoding and becomes redundant. The radio base station adjusts a rate of encoding the redundant transport block (or executes rate matching). Since adaptive modulation and coding (AMC) is adopted in the LTE system, the encoding rate is adaptively determined based on a radio quality. Specifically, the higher the radio quality, the higher the encoding rate. The lower the radio quality, the lower the encoding rate. If the radio quality is high, it is better to increase the encoding rate and efficiently transmit the data. If the radio quality is low, it is better to reduce the encoding rate and reliably transmit the data. The rate matching is achieved by puncturing a bit or bits in order to increase the encoding rate and repeating a bit or bits in order to reduce the encoding rate.

After the encoding rate is adjusted, the transport block (downlink data) is subjected to some processes such as modulation and mapped to PDSCHs allocated to data signal regions of subframes within a radio frame. The modulation is adaptively defined based on the aforementioned AMC and the radio quality. In addition, downlink control information (DCI) to be used to control the PDSCHs is mapped to PDCCHs allocated to control signal regions of subframes. In the DCI, information (resource block assignment (RB assignment) indicating resources assigned to the PDSCHs of the subframes, information (modulation and coding scheme) indicating a modulation encoding scheme based on the AMC, and the like are stored. In addition, the CRC masked (scrambled) using the identifier of the radio terminal is added to the DCI. Lastly, the radio base station transmits, to the radio terminal, a radio signal during the subframes that is included in the radio frame and to which the information has been mapped.

Figure 2:
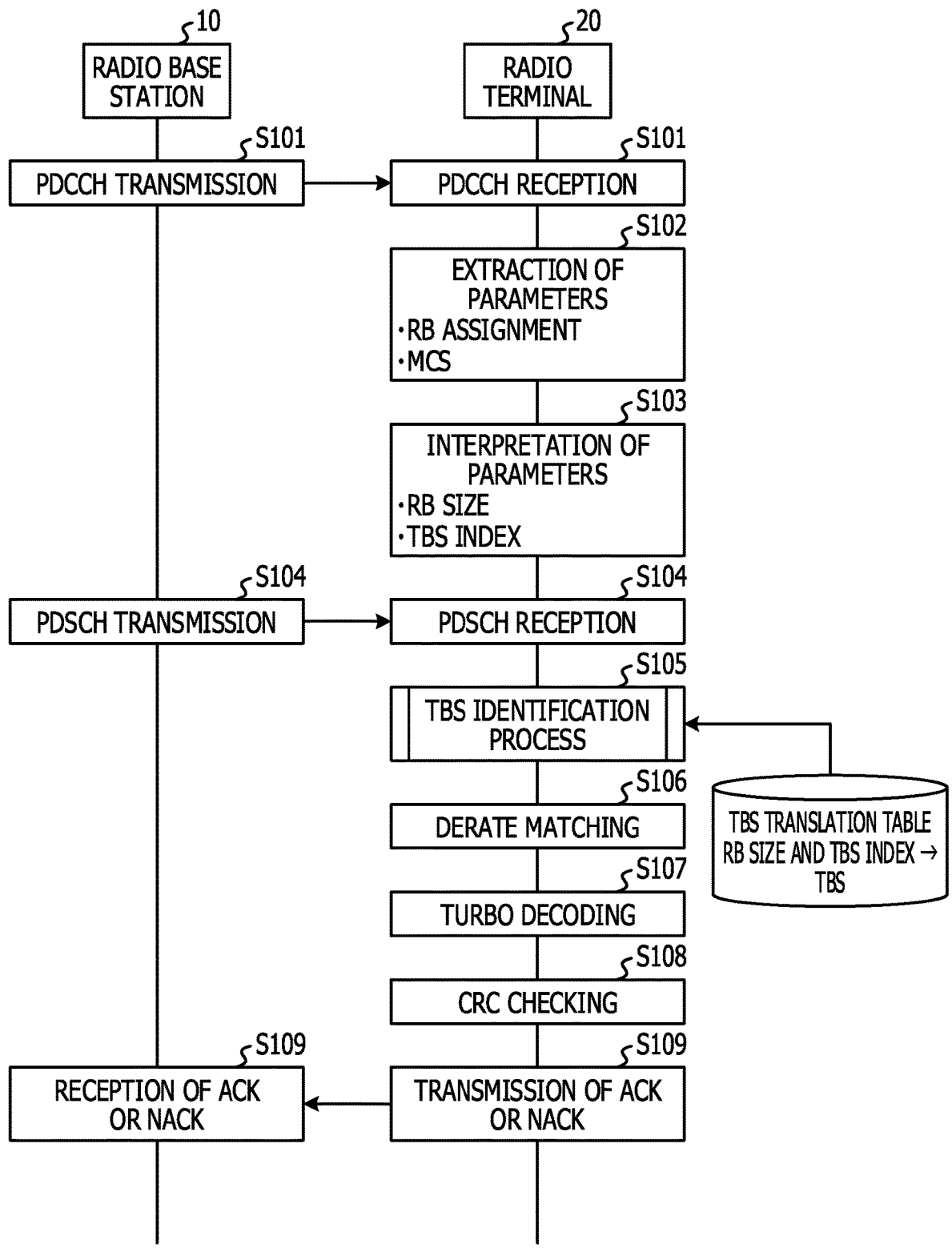
FIG. 2 is a diagram illustrating a sequence of the transmission and reception of a downlink transport block in a conventional radio communication system for LTE.

A process of receiving the transport block (downlink data) by the radio terminal 20 (receiver) is described with reference to FIG. 2. The reception process of the radio terminal 20 is a process that is in reverse of the aforementioned transmission process of the radio base station 10. In FIG. 2, processes other than transmission and reception are omitted from processes of the radio base station 10.

First, when receiving the radio signal during the subframes within the radio frame, the radio terminal 20 receives the control information mapped to the PDCCHs (in S101). This reception is executed as follows. The radio terminal 20 uses the identifier of the radio terminal 20 to check the CRC for the DCI mapped to the PDCCHs allocated to the control signal regions of the subframes. Then, if the checking of the CRC of the DCI succeeds, the radio terminal 20 determines that a destination of the DCI is the radio terminal 20. On the other hand, if the checking of the CRC of the DCI fails, the radio terminal 20 determines that the destination of the DCI is not the radio terminal 20.

Next, when detecting the DCI whose destination is the radio terminal 20, the radio terminal 20 extracts parameters included in the DCI (in S102) and may interprets the parameters (in S103). Specifically, the radio terminal 20 calculates an RB size based on the RB assignment included in the DCI. In addition, the radio terminal 20 calculates a TBS index based on the MCS included in the DCI. The RB size and the TBS index are described later. In addition, the radio terminal 20 calculates a modulation order of the data mapped to the PDSCHs.

Then, the radio terminal 20 receives the downlink data mapped to the PDSCHs (in S104). In this case, the radio terminal 20 may identify the resources assigned to the PDSCHs of the subframes and may extract the downlink data mapped to the PDSCHs. In addition, the radio terminal 20 demodulates the downlink data mapped to the PDSCHs based on the modulation order calculated from the MSC included in the DCI.

After that, some processes are executed and the radio terminal 20 executes derate matching corresponding to a process that is in reverse of the rate matching. The derate matching restores the encoded downlink data to a level before the rate matching. In other words, the derate matching restores the downlink data to a size (length) before the rate matching. In order to execute the derate matching, the radio terminal 20 identifies the size (transport-block size (TBS)) of the transport block based on information included in the DCI before the derate matching (in S105). The identification of the TBS is described later. The radio terminal 20 determines the size of the downlink data after the derate matching based on the calculated TBS and the turbo encoding rate (predetermined value of ⅓) and executes the derate matching (in S106).

Then, the radio terminal 20 executes turbo decoding on the data after the derate matching (in S107) and checks the 24-bit CRC added to the data after the decoding (in S108). If the checking of the CRC succeeds, the success of the checking indicates that the reception of the transport block (downlink data) has succeeded. In this case, the radio terminal 20 transmits, to the radio base station 10, an ACK signal indicating that the reception has succeeded (in S109). On the other hand, if the checking of the 24-bit CRC added to the data after the turbo decoding fails, the failure of the checking indicates that the reception of the transport block has failed. In this case, the radio terminal 20 transmits, to the radio base station 10, a NACK signal indicating that the reception has failed, and the radio terminal 20 prompts the radio base station 10 to retransmit the data.

As described above, the radio terminal 20 identifies the TBS that is the original size of the transmitted downlink data before the derate matching. The identification (in S105) of the TBS is executed as follows. As described above, the radio terminal 20 calculates, based on a predetermined rule from the RB assignment included in the DCI, the RB size that is the amount of the resources assigned to the PDSCHs to which the downlink data has been mapped (in S103). Resource blocks (RBs) are units (frequencies) of resources assigned in LTE. Since the size of each RB is a fixed value, the RB size corresponds to the number of the RBs. In addition, the radio terminal 20 calculates the transport-block size index (TBS index) based on a predetermined rule from the MCS included in the DCI (in S103). The TBS index is an index value that is a parameter corresponding to the TBS of the downlink data. In S105, the radio terminal 20 calculates the TBS of the downlink data based on a predetermined rule from the calculated RB size and the calculated TBS index.

FIG. 3 is a diagram describing the predetermined rule used to calculate the TBS of the downlink data from the RB size and the TBS index. A correspondence table illustrated in FIG. 3 is defined in the 3GPP standard specifications. The radio terminal 20 may calculate the TBS of the downlink data based on the correspondence table. In this specification, the translation table illustrated in FIG. 3 and to be used to calculate the TBS is referred to as a TBS translation table.

In the TBS translation table illustrated in FIG. 3, $N_{PRB}$ represented by the abscissa indicates the aforementioned RB size (the number of RBs). $N_{PRB}$ may be an integer that is any of 1 to 110. $I_{TBS}$ represented by the ordinate of the TBS translation table indicates the aforementioned TBS index. $I_{TBS}$ may be an integer that is any of 0 to 26. Each cell of the TBS translation table indicates a TBS corresponding to an RB size and a TBS index. Specifically, for example, if $N_{PRB}$ is 5 and $I_{TBS}$ is 10, the TBS is 872 based on the TBS translation table illustrated in FIG. 3. In this manner, the radio terminal 20 may calculate the TBS of the downlink data from the RB size and the TBS index based on the TBS translation table illustrated in FIG. 3.

As described above, in the conventional LTE system, each transport block is mapped to a respective PDSCH. Specifically, the transport blocks are mapped to the PDSCHs on a one-to-one basis. It is, however, technically possible to map a single transport block to a plurality of PDSCHs, and it is considered that the interested scheme may be introduced in the LTE system in the future. Hereinafter, the interested scheme is referred to as a "reference scheme". In FIG. 1, if PDSCHs are allocated across multiple subframes or multiple carriers, a PDSCH allocated to a single subframe and a PDSCH allocated to a single carrier are each treated as a single PDSCH. However, PDSCHs that are allocated across multiple subframes or carriers to which a single transport block is mapped may be treated as a single PDSCH. The same applies to FIGS. 14 and 15 (described later). In the following description, a PDSCH allocated to a single subframe and a PDSCH allocated to a single carrier are each treated as a single PDSCH for convenience.

According to the reference scheme, in the aforementioned multi-subframe scheduling and the like, a single transport block may be transmitted using multiple PDSCHs allocated to multiple subframes and the like. Thus, it is considered that the reference scheme obtains some effects, compared with the conventional scheme.

According to the reference scheme, the number of times when the radio terminal 20 transmits an ACK signal or a NACK signal may be reduced, compared with the conventional scheme. For example, according to the conventional scheme in which transport blocks are mapped to PDSCHs on a one-to-one basis, if the radio terminal 20 receives data through four PDSCHs allocated to four subframes, the radio terminal 20 transmits four signals that are each an ACK signal or a NACK signal. This is due to the fact that each of the transport blocks corresponds to a unit block in which the ACK or NACK signal is transmitted. For example, according to the reference scheme in which each transport block is mapped to a number N of PDSCHs, even if the radio terminal 20 receives data through four PDSCHs allocated to four subframes, it is sufficient if the radio terminal 20 transmits a single ACK or NACK signal, for example. It is, therefore, possible to reduce the number of radio resources to be used for the transmission of ACK and NACK signals and improve the efficiency of using radio resources. In addition, it is possible to reduce consumption power for the transmission of ACK and NACK signals and increase a total time period in which the radio terminal 20 is turned on.

According to the reference scheme, a turbo encoding gain may be improved, compared with the conventional scheme. As described above, the turbo encoder has the upper limit (of 6144 bits) on the size of data to be input to the interleaver. It is, however, known that as the size (precisely, the size of a code block) of a transport block is closer to the upper limit, a higher encoding gain is obtained. For example, four transport blocks that are used in the conventional scheme may be collectively treated as a single transport block in the reference scheme. Thus, in the reference scheme, the sizes of transport blocks may be larger, and a high encoding gain may be ensured, compared with the conventional scheme.

In addition, according to the reference scheme, the efficiency (throughput) of transmitting data may be improved, compared with the conventional scheme. As described above, according to the reference scheme, the sizes of transport blocks may be larger, compared with the conventional scheme. Thus, in the reference scheme, a rate at which a 24-bit CRC is added to each transport block is relatively low, and a high throughput may be ensured, compared with the conventional scheme.

Since it is assumed multi-subframe scheduling and the like are executed in the reference scheme, it goes without saying that the aforementioned effects of multi-subframe scheduling and the like are obtained in the reference scheme. Specifically, the efficiency of the transmission may be improved by reducing the amount of the control signal by multi-subframe scheduling. In addition, flexible scheduling may be achieved.

Since the aforementioned effects are obtained, it is considered that it is highly effective to apply the reference scheme to multi-subframe scheduling and the like to be executed for the transmission of downlink data based on LTE. However, if the reference scheme is applied to multi-subframe scheduling and the like to be executed for the transmission of downlink data based on LTE, the following problem is considered to occur. The inventors have found this problem as a result of studying the conventional techniques and the like in detail.

It is considered that the reference scheme is applied to multi-subframe scheduling and the like to be executed for the transmission of downlink data based on LTE. In this case, when receiving the downlink data, the radio terminal 20 identifies a TBS of the data. This is due to the fact that if the TBS is not identified, the derate matching is not executed and as a result, the data is not decoded.

However, if the reference scheme is applied to multi-subframe scheduling and the like to be executed for the transmission of the downlink data based on LTE, the radio terminal 20 does not calculate the TBS using a conventional method defined in LTE. As described above, in the conventional method defined in LTE, the radio terminal 20 calculates an RB size and a TBS index based on DCI accompanied with the data and calculates the TBS based on the calculated values and the TBS translation table illustrated in FIG. 3. The RB size calculated from the DCI accompanied with the data is the number of RBs assigned to a single PDSCH. However, since the data transmitted based on multi-subframe scheduling and the like is mapped to multiple PDSCHs, the RB size included in the DCI is not directly related to the TBS that is the original data size. Thus, the radio terminal 20 does not recognize a total RB size assigned to the data mapped to the multiple PDSCHs. If the total RB size is not recognized, the radio terminal 20 does not identify the TBS of the downlink based on the conventional method defined in LTE.

Specifically, in the conventional method defined in LTE, the radio terminal 20 does not identify the TBS of the data transmitted based on multi-subframe scheduling and the like. In other words, a method of identifying a TBS of data mapped to multiple subframes by the radio terminal 20 had not been known.

The above description is summarized as follows. If the aforementioned reference scheme is applied to multi-subframe scheduling and the like to be executed for the transmission of downlink data based on LTE, the aforementioned effects are obtained and the reference scheme is considered to be useful. However, if the reference scheme is applied, the radio terminal 20 does not calculate a TBS using the conventional method defined in LTE. As described above, the inventors have found this problem as a result of studying the conventional techniques in detail, and this problem had not traditionally been known. The embodiments that solve this problem are described below.

First Embodiment

In a first embodiment, after a total RB size that is the total of the sizes of RBs assigned to a transport block (downlink data) based on multi-subframe scheduling and the like is calculated, a total TBS of the transport block is calculated based on the total RB size.

That is, a radio communication system according to the first embodiment includes a transmitting device configured to execute transmission using radio resources each including a frequency bandwidth and a time period and a receiving device configured to store correspondences (or associations) between resource amounts (or resource sizes) able to be selectably assigned to the radio resources by the transmitting device and the sizes of data able to be transmitted based on the resource amounts. The transmitting device transmits, to the receiving device, the data that is to be transmitted over the multiple radio resources, first information indicating the number of the multiple radio resources, and second information indicating a first resource amount that is one of the resource amounts able to be selectably assigned. The receiving device calculates a first data size that is one of the data sizes, based on the number of the multiple radio resources, the first resource amount, and the correspondences. Then, the receiving device decodes the data based on the first data size. In the radio communication system according to the first embodiment, the receiving device calculates the first data size based on the correspondences and a second resource amount obtained by multiplying the first resource amount by the number of the radio resources.

The first embodiment is described below with reference to the accompanying drawings. The first embodiment corresponds to a case where the techniques disclosed herein are applied to an LTE system. It, however, goes without saying that the techniques disclosed herein are applicable to a radio communication system other than the LTE system. The techniques disclosed herein are applicable to uplink data by changing downlink data illustrated in some of the drawings to uplink data after a predetermined time in the same manner as the downlink data.

First, the first embodiment assumes the following. Specifically, the first embodiment assumes that the aforementioned multi-subframe scheduling and the like are executed. In this case, multi-subframe scheduling and the like may be at least one of multi-subframe scheduling and multi-carrier scheduling, as described above, for example. In addition, the first embodiment assumes that a single transport block (downlink data) may be mapped to multiple PDSCHs, like the aforementioned reference scheme.

Based on the two assumptions, it may be said that a single transport block is transmitted using multiple PDSCHs of subframes and the like in multi-subframe scheduling and the like. The first embodiment is not different in this feature from the aforementioned reference scheme. It may be said that the first embodiment solves the problem with the reference scheme and achieves the same functions as the reference scheme.

The radio communication system according to the first embodiment executes multi-subframe scheduling and the like. It, however, goes without saying that the radio communication system according to the first embodiment may execute scheduling on a single subframe and a single carrier. However, unless otherwise noted, in order to avoid the complexity of the following description, the following description assumes that the radio communication system according to the first embodiment transmits data using multi-subframe scheduling and the like.

Figure 4:
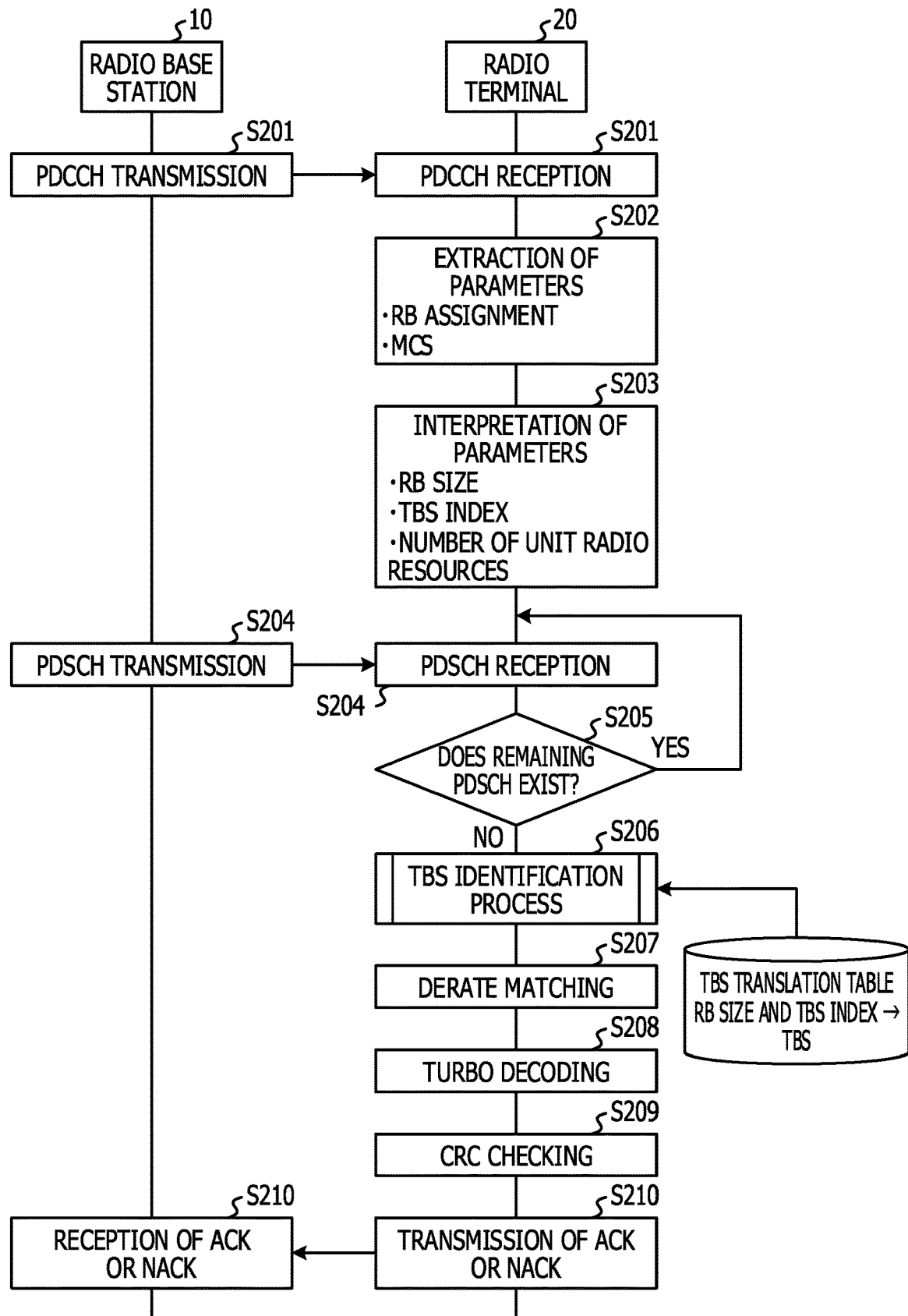
FIG. 4 is a diagram illustrating a sequence of the transmission and reception of a downlink transport block in a radio communication system according to a first embodiment.

FIG. 4 illustrates an example of a sequence of a process of transmitting and receiving a transport block (downlink data) in the radio communication system according to the first embodiment. The sequence illustrated in FIG. 4 corresponds to a sequence of a process of transmitting and receiving a transport block according to the conventional technique illustrated in FIG. 1.

In S201 illustrated in FIG. 4, the radio base station 10 transmits, to the radio terminal 20, a PDCCH to which downlink control information (DCI) is mapped. As described above, before the transmission of downlink data, the radio base station 10 maps, to the PDCCH, the DCI to be used to control the downlink data and transmits the DCI mapped to the PDCCH. Thus, the transmission of the PDCCH may be interpreted as the transmission of the DCI. The radio base station 10 adds a CRC scrambled with the identifier of the radio terminal 20 to the DCI to be transmitted to the radio terminal 20, maps the CRC to the PDCCH allocated to a control signal region of a downlink subframe within a downlink radio frame, and transmits the DCI mapped to the PDCCH and having the CRC added thereto to the radio terminal 20.

In S201, the radio terminal 20 receives, from the radio base station 10, the PDCCH to which the DCI is mapped. The reception of the PDCCH may be interpreted as the reception of the DCI. The radio terminal 20 uses the identifier of the radio terminal 20 to check the CRC added to the DCI mapped to the PDCCH allocated to the control signal region of the downlink subframe. If the checking of the CRC mapped to the DCI succeeds, the radio terminal 20 determines that a destination of the DCI is the radio terminal 20, and the radio terminal 20 receives the DCI. On the other hand, if the checking of the CRC fails, the radio terminal 20 determines that the destination of the DCI is not the radio terminal 20, and the radio terminal 20 does not receive the DCI. The example illustrated in FIG. 4 assumes that the checking of the CRC mapped to the DCI succeeds and the radio terminal 20 receives the DCI whose destination is the radio terminal 20.

Next, in S202 illustrated in FIG. 4, the radio terminal 20 extracts, from the DCI, parameters to be used to receive the transport block (downlink data).

The DCI that is the downlink control information of the LTE system is described. There are some types of DCI. DCI format 1 that is one type of DCI to be used to transmit downlink data is described as an example. In each embodiment, other DCI (for example, a DCI format 2 and the like) to be used to transmit downlink data may be used in the same manner as DCI format 1, but a detailed description thereof is omitted.

FIG. 5 illustrates an example of details of DCI format 1. DCI format 1 includes a resource block assignment (RB assignment), a modulation and coding scheme (MCS), and a carrier indicator field (CIF) that are parameters to be used to receive the transport block (downlink data). These parameters and the present application are not so relevant, and a description thereof is omitted.

The RB assignment is a parameter that indicates radio resources in downlink subframes to which PDSCHs to which the downlink data is mapped are allocated. Specifically, the RB assignment is a parameter that uses a unit called a resource block (RB) to indicate frequency components of regions in which the PDSCHs (to which the downlink data is mapped) are allocated to the downlink subframes. For example, in the DC format 1, discontinuous RBs may be specified using a bitmap. For example, in DC format 1A, continuous RBs may be specified. In both cases, the radio terminal 20 may recognize RBs to which the PDSCHs are allocated in the downlink subframes. Thus, the radio terminal 20 may extract the downlink data mapped to the PDSCHs allocated to the downlink subframes.

Resources to which the PDSCHs are allocated in the downlink subframes for LTE are determined to be symbols that exclude control signal regions at the beginnings of the subframes in a time axis direction. Thus, the radio base station 10 does not inform the radio terminal 20 of time components of the resources to which the PDSCHs are allocated.

The MCS that is included in the DCI is a parameter that indicates a modulation and encoding scheme that is executed on the downlink data mapped to the PDSCHs. The radio terminal 20 demodulates and decodes, based on the MCS, the downlink data extracted from the PDSCHs allocated to the downlink subframes based on the RB assignment included in the DCI and may acquire the downlink data mapped to the PDSCHs. The MCS is 5-bit information and is any of integers 0 to 31.

The CIF is a parameter that indicates multiple subframes and the like to be controlled based on the DCI in multi-subframe scheduling and the like. The CIF for LTE is 3-bit information and is a parameter originally identifying carriers. For example, if multi-carrier scheduling is executed, multiple carriers to be controlled based on the DCI may be indicated by the CIF. Specifically, under a condition in which only a single carrier other than a carrier on which the DCI is transmitted is specified as one of multiple carriers to be controlled based on the DCI, the identifier of the other carrier may be indicated by the CIF. As another example, the multiple carriers to be controlled based on the DCI may be continuous carriers for a number indicated by the 3 bits of the CIF. As another example, the multiple carriers to be controlled based on the DCI may be indicated by a bitmap based on the 3 bits of the CIF.

As described above, the CIF is the parameter originally identifying the carriers. The CIF may be expanded to a parameter identifying resources other than carriers. For example, if multi-subframe scheduling is executed, multiple subframes to be controlled based on the DCI may be indicated by the CIF. Specifically, as an example, the multiple subframes to be controlled based on the DCI may be continuous subframes for the number indicated by the 3 bits of the CIF. As another example, the multiple subframes to be controlled based on the DCI may be indicated by the bitmap based on the 3 bits of the CIF.

In addition, the CIF may indicate both multiple subframes and multiple carriers. As an example, the 3 bits of the CIF may be divided into the top 1 bit and the remaining 2 bits, the top 1 bit may indicate the multiple carriers, and the remaining 2 bits may indicate the multiple subframes. Instead of the CIF, a subframe indicator field (SIF) that is a 3-bit region indicating multiple subframes may be prepared and indicate the multiple subframes.

In the aforementioned cases, multiple subframes and the like to be controlled based on the DCI (mapped to the PDCCH) in multi-subframe scheduling and the like may be indicated by the CIF, the SIF, or the like. Multiple subframes and the like that are described in the present specification are a concept of resources including multiple subframes and multiple carriers, although the description is repeated. Hereinafter, information that is the CIF or the like and indicates multiple subframes and the like is collectively referred to as multi-subframe, etc. information.

Return to the description of FIG. 4. In S203, the radio terminal 20 interprets the parameters included in the DCI. Specifically, the radio terminal 20 calculates other parameters to be used in a subsequent process, based on the aforementioned RB assignment, the MCS, and the multi-subframe, etc. information (CIF or the like). The process of S203 is described in detail below.

First, in S203, the radio terminal 20 calculates an RB size (the number of RBs) per unit radio resource (a single subframe of a single carrier) based on the RB assignment. The RB assignment indicates continuous RBs within a subframe or indicates discontinuous RBs within the subframe using a bitmap. In both cases, the radio terminal 20 calculates the RB size per unit radio resource (but a detailed description thereof is omitted).

In S203, the radio terminal 20 calculates a TBS index based on the MCS. As described above, the TBS index corresponds to the size of the transport block (downlink data) and is a parameter to be used in the derate matching to be executed on the downlink data. The radio terminal 20 calculates the TBS index from the MCS based on a predetermined rule. Specifically, the radio terminal 20 calculates the TBS index from the MCS based on a TBS translation table illustrated in FIG. 6. The TBS translation table illustrated in FIG. 6 is defined in the 3GPP standard specifications. In the TBS translation table illustrated in FIG. 6, the MCS is represented by $I_{MCS}$, and the TBS index is represented by $I_{TBS}$. A modulation order of the downlink data mapped to the PDSCHs is represented by $Q_m$. As is apparent from the TBS translation table, the radio terminal 20 calculates the TBS index and the modulation order from the MCS. As an example, if a value of the MCS is 12, the TBS index is 11 and the modulation order is 4 based on the table illustrated in FIG. 6.

In addition, the radio terminal 20 calculates the number of unit radio resources (that are each a single subframe of a single carrier) to be controlled based on the DCI in multi-subframe scheduling and the like. Multi-subframe scheduling and the like are a concept that includes multi-subframe scheduling and multi-carrier scheduling, as described above. A specific example is described below. For example, if the fact that multi-subframe scheduling and the like are not applied is recognized based on the CIF or the like, the number of unit radio resources to be controlled based on the DCI is 1. If the fact that multi-subframe scheduling in which the number of subframes is 3 is applied is recognized based on the CIF or the like, the number of unit radio resources to be controlled based on the DCI is 3. If the fact that multi-carrier scheduling in which the number of carriers is 2 is applied is recognized based on the CIF or the like, the number of unit radio resources to be controlled based on the DCI is 2. If the fact that multi-subframe scheduling in which the number of subframes is 3 and multi-carrier scheduling in which the number of carriers is 2 are applied is recognized based on the CIF or the like, the number of unit radio resources to be controlled based on the DCI is 6 (=3×2). In this manner, the radio terminal 20 may calculate the number of unit radio resources to be controlled based on the DCI, based on the multi-subframe, etc. information that is the CIF or the like.

Next, in S204 and S205, the radio base station 10 transmits, to the radio terminal 20, the multiple PDSCHs to which the transport block (downlink data) is mapped. The transmission of the PDSCHs corresponds the PDCCH transmitted in S201. In the first embodiment, based on the aforementioned two assumptions, a single transport block (downlink data) is transmitted using multiple PDSCHs allocated to multiple unit radio resources. The radio base station 10 maps the transport block (downlink data) to the multiple PDSCHs allocated to the multiple unit radio resources based on the multi-subframe, etc. information (CFI or the like) included in the DCI mapped to the PDCCH and transmitted in S201 and transmits the transport block mapped to the PDSCHs. The process of S204 is not different from the aforementioned conventional process of transmitting a transport block in the conventional LTE system, except that the transport block (downlink data) is divided into multiple blocks, and a detailed description thereof is omitted.

In S204 and S205, the radio terminal 20 receives, from the radio base station 10, the multiple PDSCHs to which the transport block (downlink data) is mapped. Specifically, the radio terminal 20 receives the transport block (downlink data) mapped to the multiple PDSCHs allocated to the multiple unit radio resources based on the multi-subframe, etc. information included in the DCI mapped to the PDCCH and received in S201.

In S204, the radio terminal 20 receives the multiple PDSCHs to which the transport block (downlink data) is mapped. In this case, the radio terminal 20 identifies RBs assigned to the PDSCHs allocated to the subframes, based on the RB assignment included in the DCI received in S201. In addition, the radio terminal 20 demodulates the downlink data mapped to the PDSCHs using the modulation order calculated based on the MCS included in the DCI. When receiving all the downlink data mapped to the multiple PDSCHs, the radio terminal 20 synthesizes the downlink data based on a predetermined rule and causes the process to proceed to S206.

The PDCCH used in S201 illustrated in FIG. 4 and a PDSCH used in S204 executed first are normally transmitted and received in a single downlink subframe. In other words, the PDCCH used in S201 and the PDSCH used in S204 executed first are normally allocated to the same subframe. The PDCCH used in S201 and the PDSCH used in S204 executed first, however, are not limited to this. The PDCCH used in S201 and the first PDSCH used in S204 executed first may be transmitted in or allocated to different subframes or may be transmitted on or allocated to different carriers.

Next, in S206 illustrated in FIG. 4, the radio terminal 20 identifies the size (TBS) of the transport block (downlink data) received in S204 and S205. As described above, the TBS is the parameter to be used to execute the derate matching in order to decode the downlink data. In S206, the radio terminal 20 calculates the TBS based on the RB size calculated in S203, the number of unit radio resources, and the TBS index. The process of S206 is described later in detail.

In S207 illustrated in FIG. 4, the radio terminal 20 executes the derate matching on the downlink data received and demodulated in S204 based on the TBS calculated in S206. The derate matching restores the encoded received data to a level before the rate matching. In other words, the received data is restored to a size (length) before the rate matching. The size of the data after the derate matching is calculated based on the TBS calculated in S206 and the turbo encoding rate (predetermined value of ⅓) used for the downlink data.

In S208 illustrated in FIG. 4, the radio terminal 20 executes turbo decoding on the downlink data subjected to the derate matching in S207. In S209, the radio terminal 20 checks the 24-bit CRC added to the downlink data decoded in S208. If the checking of the CRC succeeds, the success of the checking indicates that the reception of the transport block has succeeded. On the other hand, if the checking of the 24-bit CRC added to the downlink data after the turbo decoding fails, the failure of the checking indicates that the reception of the transport block has failed.

Lastly, in S210 illustrated in FIG. 4, the radio terminal 20 transmits a response signal to the transport block (downlink data) to the radio base station 10 based on the checking executed in S209. Specifically, if the checking of S209 succeeds, the radio terminal 20 transmits an ACK signal indicating the success of the reception to the radio base station 10. Then, the process of transmitting and receiving the transport block is completed. On the other hand, if the checking of S209 fails, the radio terminal 20 transmits a NACK signal indicating the failure of the reception to the radio base station 10. In this case, the radio base station 10 retransmits the transport block to the radio terminal 20. A detailed description of the retransmission is omitted.

Next, a TBS identification process according to the first embodiment is described with reference to FIG. 7. The flow of the TBS identification process illustrated in FIG. 7 details the process to be executed by the radio terminal 20 in S206 illustrated in FIG. 4.

Figure 7:
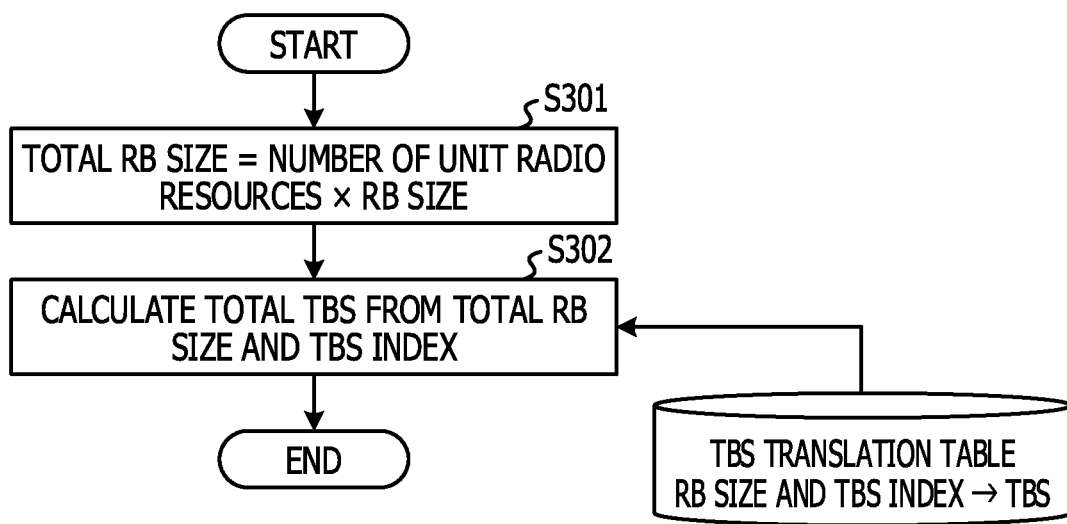
FIG. 7 is a flowchart of a TBS identification process according to the first embodiment.

In S301 illustrated in FIG. 7, the radio terminal 20 calculates a total RB size that is the total of the sizes of all RBs assigned to the transport block (downlink data) by multi-subframe scheduling and the like. The total RB size corresponds to the total of the sizes of the RBs assigned to the multiple PDSCHs to which the transport block is mapped.

The RB size calculated in S203 illustrated in FIG. 4 corresponds to a resource amount (or the number of RBs) assigned to a single PDSCH allocated to a single unit radio resource (a single subframe of a single carrier). In other words, the RB size corresponds to a RB size per unit radio resource, which may be referred to as an individual resource size. Thus, the total RB size can be calculated as the product of the number, calculated in S203 illustrated in FIG. 4, of unit radio resources and the RB size. As an example, if the number of unit radio resources is 2 and the RB size is 4 RBs, the total RB size assigned to the downlink data is calculated to be 2×4=8 RBs.

In S302 illustrated in FIG. 7, the radio terminal 20 calculates, from the total RB size calculated in S301 and the TBS index calculated in S203 illustrated in FIG. 4 based on the aforementioned predetermined rule, the total TBS that is the size of the overall transport block (downlink data) transmitted based on multi-subframe scheduling and the like. Specifically, the radio terminal 20 calculates the total TBS by setting the total RB size to a value of the abscissa and the TBS index to a value of the ordinate in the TBS translation table illustrated in FIG. 3. As an example, if the total RB size is 8 RBs and the TBS index is 7, the total TBS is calculated to be 968 from the TBS translation table illustrated in FIG. 3.

According to the aforementioned first embodiment, even when the transport block (downlink data) is transmitted based on multi-subframe scheduling and the like, the radio terminal 20 may calculate the TBS. Specifically, the aforementioned remaining problem with the reference scheme is solved. Thus, even when the transport block is transmitted based on multi-subframe scheduling and the like, the radio terminal 20 may appropriately receive the downlink data. According to the first embodiment, it goes without saying that benefits, which are a reduction in the number of times when an ACK or NACK signal is transmitted, the improvement of a turbo encoding gain, the improvement of the efficiency of transmitting data, and the like, are provided by multi-subframe scheduling and the like. Thus, according to the first embodiment, it is possible to obtain a new effect in which the radio terminal 20 appropriately receives a transport block, while the various benefits are provided by multi-subframe scheduling and the like.

In addition, the first embodiment may be achieved using the parameters and TBS translation table already defined in the 3GPP standard specifications. In other words, a new parameter, a new TBS translation table, and the like are not introduced in the 3GPP standard specifications according to the first embodiment. Thus, the techniques described in the first embodiment may be introduced as long as minimal modifications are made to the 3GPP standard specifications. Thus, according to the first embodiment, it is possible to obtain an effect in which the techniques described in the first embodiment may be easily introduced and the cost of the introduction may be suppressed.

Second Embodiment

The first embodiment describes the case where after the total RB size assigned to the transport block (downlink data) by multi-subframe scheduling and the like is calculated, the total TBS of the transport block is calculated based on the total RB size. On the other hand, a second embodiment describes a case where after a TBS per unit radio resource is calculated, a total TBS is calculated based on the calculated TBS.

That is, a radio communication system according to the second embodiment includes a transmitting device configured to execute transmission using radio resources each including a frequency bandwidth and a time period and a receiving device configured to store correspondences between resource amounts able to be selectably assigned to the radio resources by the transmitting device and the sizes of data able to be transmitted based on the resource amounts. The transmitting device transmits, to the receiving device, the data that is to be transmitted over the multiple radio resources, first information indicating the number of the multiple radio resources, and second information indicating a first resource amount that is one of the resource amounts able to be selectably assigned. The receiving device calculates a first data size that is one of the data sizes, based on the number of the multiple radio resources, the first resource amount, and the correspondences. Then, the receiving device decodes the data based on the first data size. In the radio communication system according to the second embodiment, the receiving device calculates, based on the first resource amount and the correspondences, a second data size that is one of the data sizes, and the receiving device calculates the first data size by multiplying the second data size by the number of the radio resources.

Many features are common to the first embodiment and the second embodiment. Features of the second embodiment that are different from the first embodiment are mainly described below.

The overall flow of downlink data communication according to the second embodiment is the same as or similar to the first embodiment, and a description of the overall flow is omitted. The overall flow of the downlink data communication according to the first embodiment is described above with reference to FIG. 4.

Figure 8:
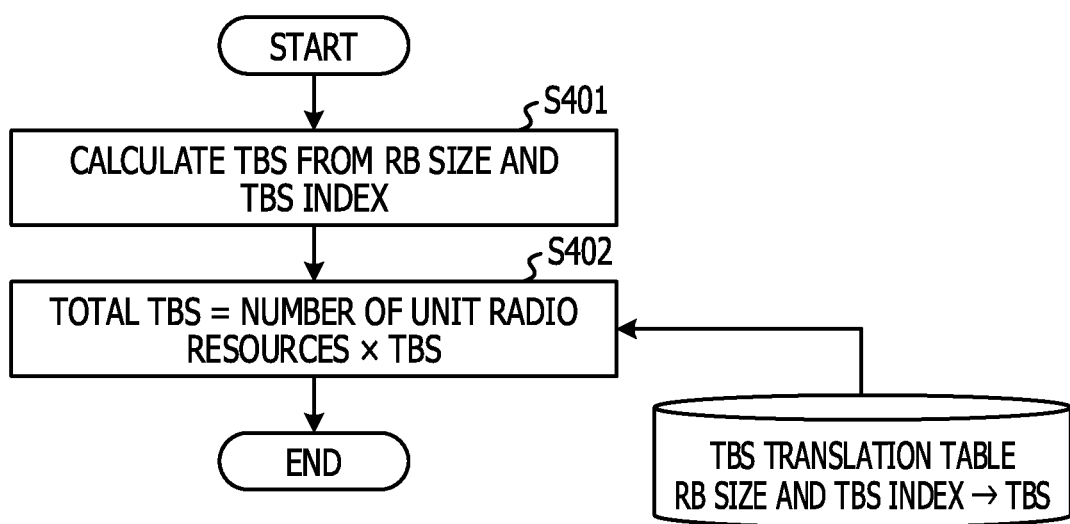
FIG. 8 is a flowchart of a TBS identification process according to a second embodiment.

A TBS identification process (corresponding to S206 of the overall flow illustrated in FIG. 4) according to the second embodiment is different from the first embodiment. FIG. 8 illustrates the flow of the TBS identification process according to the second embodiment.

In S401 illustrated in FIG. 8, the radio terminal 20 calculates a TBS per unit radio resource, which may be referred to as an individual data size. The radio terminal 20 calculates the TBS per unit radio resource based on a predetermined rule from the RB size (corresponding to the RB size per unit radio resource) calculated in S203 illustrated in FIG. 4 and the TBS index. Specifically, the radio terminal 20 calculates the TBS per unit radio resource by setting the RB size to a value of the abscissa and the TBS index to a value of the ordinate in the TBS translation table illustrated in FIG. 3. As an example, if the RB size is 4 RBs and the TBS index is 7, the TBS per unit radio resource is calculated to be 472 from the TBS translation table illustrated in FIG. 3.

In S402 illustrated in FIG. 8, the radio terminal 20 calculates the total TBS that is the size of the overall transport block (downlink data) transmitted based on multi-subframe scheduling and the like. The TBS of the downlink data may be calculated as the product of the number, calculated in S203 illustrated in FIG. 4, of unit radio resources and the TBS, calculated in S401, per unit radio resource. As an example, if the number of unit radio resources is 3 and the TBS per unit radio resource is 472, the total TBS of the transport block transmitted based on multi-subframe scheduling and the like is 3×472=944.

According to the aforementioned second embodiment, it is possible to obtain the same effect as the first embodiment. Specifically, according to the second embodiment, it is possible to obtain the new effect in which the radio terminal 20 may appropriately receive the transport block (downlink data), while the various benefits are provided by multi-subframe scheduling and the like. In addition, according to the second embodiment, it is possible to obtain an effect in which the techniques described in the second embodiment may be easily introduced and the cost of the introduction may be suppressed.

In the first embodiment, a case where the total of all the RB sizes calculated in S301 illustrated in FIG. 7 exceeds 110 is not supported. This is due to the fact that since the maximum value among the values of the abscissa of the TBS translation table illustrated in FIG. 3 is 110, the TBS translation table is not applicable in S302 illustrated in FIG. 7. On the other hand, in the second embodiment, if the total of all the RB sizes exceeds 110 and the RB size per unit radio resource does not exceed 110, the case where the total of all the RB sizes calculated in S301 illustrated in FIG. 7 exceeds 110 may be supported. Thus, even if a transport block (downlink data) with a large size to which the first embodiment is not applicable is transmitted, the second embodiment is applicable and thus has an advantage.

Third Embodiment

In a third embodiment, if the first embodiment is applicable, the first embodiment is applied, and if the second embodiment is applicable, the second embodiment is applied.

That is, a radio communication system according to the third embodiment includes a transmitting device configured to execute transmission using radio resources each including a frequency bandwidth and a time period and a receiving device configured to store correspondences between resource amounts able to be selectably assigned to the radio resources by the transmitting device and the sizes of data able to be transmitted based on the resource amounts. The transmitting device transmits, to the receiving device, the data that is to be transmitted over the multiple radio resources, first information indicating the number of the multiple radio resources, and second information indicating a first resource amount that is one of the resource amounts able to be selectably assigned. The receiving device calculates a first data size that is one of the data sizes, based on the number of the multiple radio resources, the first resource amount, and the correspondences. Then, the receiving device decodes the data based on the first data size. In the radio communication system according to the third embodiment, if a second resource amount obtained by multiplying the first resource amount by the number of the radio resources does not exceed the maximum value among the resource amounts able to be selectably assigned, the receiving device calculates the first data size based on the second resource amount and the correspondences. If the second resource amount exceeds the maximum value among the resource amounts able to be selectably assigned, the receiving device calculates, based on the first resource amount and the correspondences, a second data size that is one of the data sizes, and the receiving device calculates the first data size by multiplying the second data size by the number of the radio resources.

Many features are common to the first embodiment and the third embodiment. Features of the third embodiment that are different from the first embodiment are mainly described below.

The overall flow of downlink data communication according to the third embodiment is the same as or similar to the first embodiment, and a description of the overall flow is omitted. The overall flow of the downlink data communication according to the first embodiment is described above with reference to FIG. 4.

Figure 9:
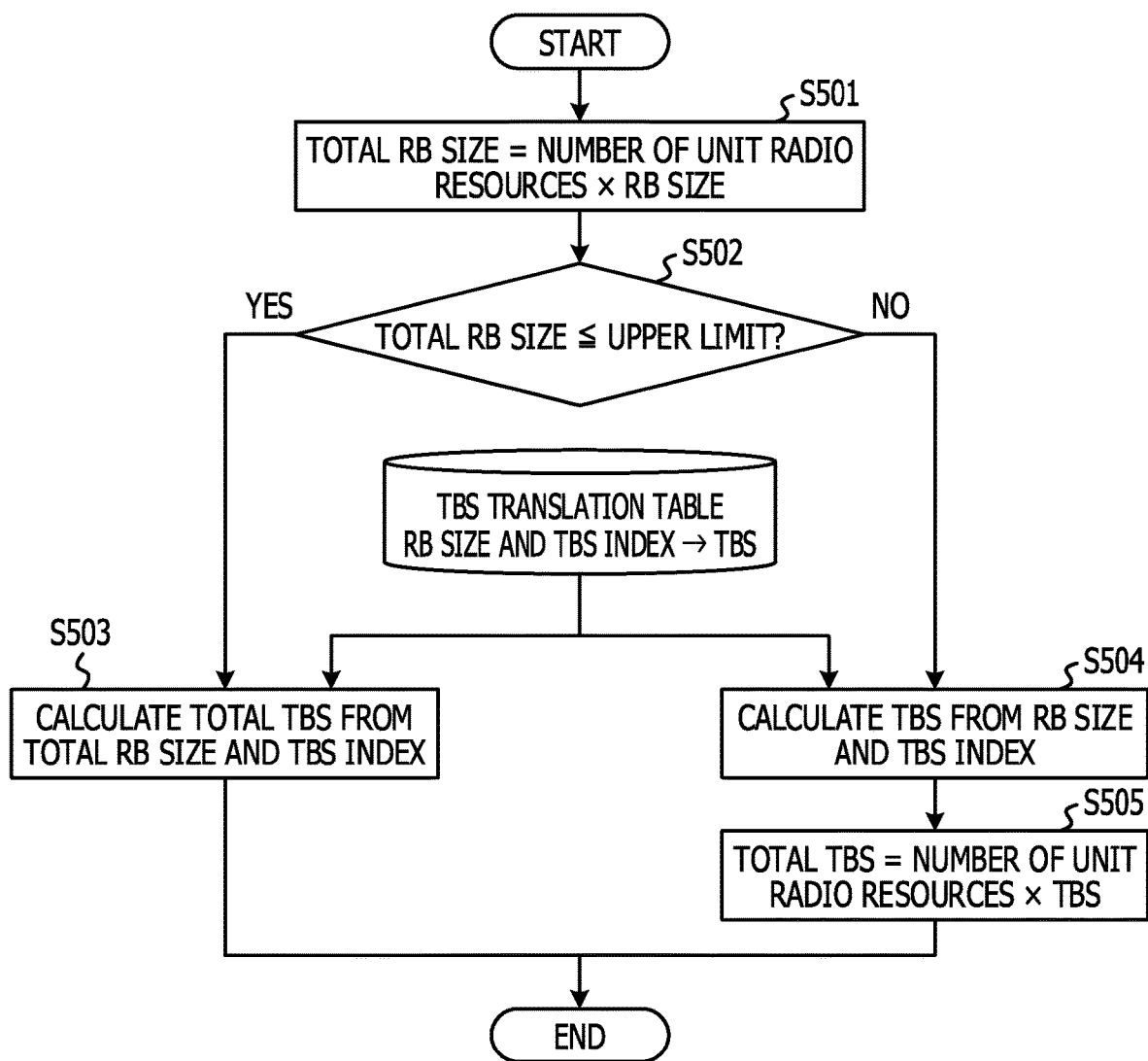
FIG. 9 is a flowchart of a TBS identification process according to a third embodiment.

A TBS identification process (corresponding to S206 of the overall flow illustrated in FIG. 4) according to the third embodiment is different from the first embodiment. FIG. 9 illustrates the flow of the TBS identification process according to the third embodiment.

In S501 illustrated in FIG. 9, the radio terminal 20 calculates the total RB size assigned to the transport block (downlink) by multi-subframe scheduling and the like. The process of S501 is the same as S301 illustrated in FIG. 7. Specifically, the total RB size (expressed in resource block units) may be calculated as the product of the number, calculated in S203 illustrated in FIG. 4, of unit radio resources and the RB size (corresponding to the resource amount per unit radio resource).

In S502 illustrated in FIG. 9, the radio terminal 20 determines whether or not the total RB size calculated in S501 is equal to or smaller than an upper limit. The upper limit corresponds to the upper limit on the RB size in the TBS translation table illustrated in FIG. 3 and is 110, which may be referred to as a maximum individual resource size. If the total RB size is equal to or smaller than 110, the radio terminal 20 causes the process to proceed to S503. If the total RB size exceeds 110, the radio terminal 20 causes the process to proceed to S504.

In S503 illustrated in FIG. 9, the radio terminal 20 calculates the total TBS that is the size of the overall transport block (downlink data) transmitted based on multi-subframe scheduling and the like, based on a predetermined rule from the total RB size calculated in S501 and the TBS index calculated in S203 illustrated in FIG. 4. The process of S503 is the same as S302 illustrated in FIG. 7. Specifically, the radio terminal 20 may calculate the total TBS of the transport block transmitted based on multi-subframe scheduling and the like by setting the total RB size to a value of the abscissa and the TBS index to a value of the ordinate in the TBS translation table illustrated in FIG. 3.

In S504 illustrated in FIG. 9, the radio terminal 20 calculates a TBS per unit radio resource. The process of S504 is the same as S401 illustrated in FIG. 8. Specifically, the radio terminal 20 may calculate the TBS per unit radio resource based on a predetermined rule from the RB size, calculated in S203 illustrated in FIG. 4, per unit radio resource and the TBS index.

In S505 illustrated in FIG. 9, the radio terminal 20 calculates the total TBS of the transport block (downlink data) transmitted based on multi-subframe scheduling and the like. The process of S505 is the same as S402 illustrated in FIG. 8. Specifically, the total TBS of the transport block may be calculated as the product of the number, calculated in S203 illustrated in FIG. 4, of unit radio resources and the TBS, calculated in S504, per unit radio resource.

According to the aforementioned third embodiment, it is possible to obtain the same effect as the first embodiment. Specifically, according to the third embodiment, it is possible to obtain the new effect in which the radio terminal 20 may appropriately receive the transport block (downlink data), while the various benefits are provided by multi-subframe scheduling and the like. In addition, according to the third embodiment, it is possible to obtain an effect in which the techniques described in the third embodiment may be easily introduced and the cost of the introduction may be suppressed.

As described above, even if a transport block (downlink data) with a large size to which the first embodiment is not applicable is transmitted, the second embodiment is applicable and thus has an advantage. The compatibility with the existing standard specifications is high and the optimal characteristics may be easily obtained in the third embodiment, compared with the first embodiment and the second embodiment. This is due to the fact that while the process described in the first embodiment is based on the TBS translation table illustrated in FIG. 3, the process described in the second embodiment is slightly shifted from the process based on the TBS translation table. This shift is apparent from the fact that the TBS calculated in the first embodiment is 968 and the TBS calculated in the second embodiment is 944, regardless of the fact that the first embodiment and the second embodiment are described based on the same specific example.

The first embodiment and the second embodiment have the advantages, respectively. In the third embodiment, the first embodiment and the second embodiment are used independently of each other based on a situation, and the advantages of both first and second embodiments may be obtained simultaneously.

Fourth Embodiment

In a fourth embodiment, a TBS translation table obtained by expanding the TBS translation table illustrated in FIG. 3 is prepared in advance.

Many features are common to the first embodiment and the fourth embodiment. Features of the fourth embodiment that are different from the first embodiment are mainly described below.

The overall flow of downlink data communication according to the fourth embodiment is the same as or similar to the first embodiment, and a description of the overall flow is omitted. The overall flow of the downlink data communication according to the first embodiment is described above with reference to FIG. 4.

A TBS identification process according to the fourth embodiment is different from the TBS identification process according to the first embodiment. In the fourth embodiment, the TBS translation table that is different from the TBS translation table illustrated in FIG. 3 is used to calculate a TBS. In the first embodiment, since the TBS is calculated based on the TBS translation table (illustrated in FIG. 3) already defined in the 3GPP standard specifications, the total RB size to be assigned in multi-subframe scheduling and the like is limited. On the other hand, in the fourth embodiment, in order to remove the limit, the new TBS table (hereinafter referred to as expanded TBS translation table) obtained by expanding the TBS translation table illustrated in FIG. 3 is introduced.

FIG. 10 illustrates an example of the expanded TBS translation table to be used in the fourth embodiment. The ordinate of the expanded TBS translation table illustrated in FIG. 10 indicates the TBS index, like FIG. 3, while the TBS index is in a range of values 0 to 26. The abscissa of the expanded TBS translation table illustrated in FIG. 10 indicates the RB size (or the number of RBs), like FIG. 3. However, while the RB size is in a range of values 1 to 110 in FIG. 3, the RB size is in a range from 111 to a greater value in FIG. 10.

Specifically, values of the abscissa of the expanded TBS translation table illustrated in FIG. 10 exceed 100 and are obtained by multiplying the values of 1 to 110 by an integer satisfying a predetermined requirement. It is assumed that the predetermined requirement is a value (excluding 1) that may be the number of unit radio resources (that are each a single subframe of a single carrier) used in multi-subframe scheduling and the like.

This value is described below in detail with reference to FIG. 10. FIG. 10 assumes that the number of subframes able to be used in multi-subframe scheduling is 5 and that multi-carrier scheduling is not used. In this case, the value that may be the number of unit radio resources (that are each a single subframe of a single carrier) used in multi-subframe scheduling and the like is 2, 3, 4, or 5. These values 2, 3, 4, and 5 are integers satisfying the predetermined requirement.

Thus, the first value of the abscissa of FIG. 10 is 111 that is obtained by multiplying 37 by 3, and the next value is 112 that is obtained by multiplying 56 by 2 or the like. 113 is a prime number and is not a value obtained by multiplying any of the values 1 to 110 by any of integers 2 to 5 and thus is not a value of the abscissa of FIG. 10. The third value of the abscissa of FIG. 10 is 114 that is obtained by multiplying 57 by 2 or the like. Subsequent values of the abscissa of FIG. 10 are determined in the same manner. The second last value of the abscissa is 545 that is obtained by multiplying 109 by 5, and the last value of the abscissa is 550 that is obtained by multiplying 110 by 5. In this manner, it is possible to cover all possible total RB sizes in the case where the number of subframes able to be used in multi-subframe scheduling is 5 and multi-carrier scheduling is not used. In this case, the number of entries of the abscissa of FIG. 10 is 214.

Another specific example of the expanded TBS translation table is described with reference to FIG. 11. FIG. 11 assumes that the number of subframes able to be used in multi-subframe scheduling is 5 and that the number of carriers able to be used in multi-carrier scheduling is 5. In this case, a value that may be the number of unit radio resources (that are each a single subframe of a single carrier) to be used in multi-subframe scheduling and the like is an integer (excluding 1) obtained by multiplying any of integers 1 to 5 by any of integers 1 to 5 and is 2, 3, 4, 5, 6, 8, 9, 10, 12, 15, 16, 20, or 25. These values 2, 3, 4, 5, 6, 8, 9, 10, 12, 15, 16, 20, and 25 are integers satisfying the predetermined requirement.

Thus, the first value of the abscissa of FIG. 11 is 111 that is obtained by multiplying 37 by 3, and the next value is 112 that is obtained by multiplying 56 by 2 or the like. 113 is a prime number and is not a value obtained by multiplying any of the values 1 to 110 by any of integers 1 to 5 and thus is not a value of the abscissa of FIG. 11. The third value of the abscissa of FIG. 11 is 114 that is obtained by multiplying 57 by 2 or the like. Subsequent values of the abscissa of FIG. 11 are determined in the same manner. The second last value of the abscissa of FIG. 11 is 2725 that is obtained by multiplying 109 by 25, and the last value is 2750 that is obtained by multiplying 110 by 25. In this manner, it is possible to cover all possible total RB sizes in the case where the number of subframes able to be used in multi-subframe scheduling is 5 and the number of carriers able to be used in multi-carrier scheduling is 5. In this case, the number of entries of the abscissa of FIG. 11 is 614.

Values (TBSs) of cells of the TBS translation table illustrated in FIGS. 10 and 11 are determined in advance based on a predetermined rule. The values of the cells may be determined based on various elements including a data size and an encoding rate that are used in an application, but a detailed description thereof is omitted.

Figure 12:
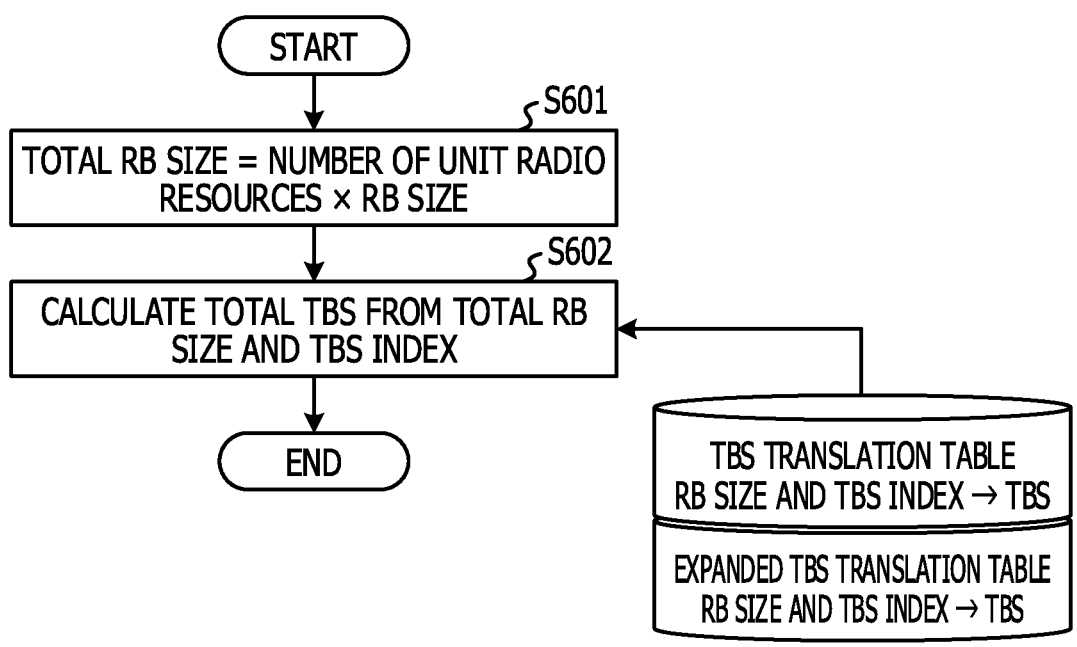
FIG. 12 is a flowchart of a TBS identification process according to the fourth embodiment.

FIG. 12 illustrates an example of the flow of the TBS identification process according to the fourth embodiment. This example assumes that the TBS translation table illustrated in FIG. 3 and the expanded TBS translation table illustrated in FIG. 10 are used.

In S601 illustrated in FIG. 12, the radio terminal 20 calculates the total RB size assigned to the transport block (downlink data) transmitted based on multi-subframe scheduling and the like. The process of S601 is the same as S301 illustrated in FIG. 7. Specifically, the total RB size may be calculated as the product of the number, calculated in S203 illustrated in FIG. 4, of unit radio resources and the RB size per unit radio resource.

In S602 illustrated in FIG. 12, the radio terminal 20 calculates the total TBS that is the size of the overall transport block (downlink data) transmitted based on multi-subframe scheduling and the like, based on a predetermined rule from the total RB size calculated in S601 and the TBS index calculated in S203 illustrated in FIG. 4. In this case, the radio terminal 20 determines whether or not the total RB size calculated in S601 is equal to or smaller than 110. If the total RB size calculated in S601 is equal to or smaller than 110, the radio terminal 20 calculates the total TBS using the TBS translation table illustrated in FIG. 3. On the other hand, if the total RB size calculated in S601 exceeds 110, the radio terminal 20 calculates the total TBS using the expanded TBS translation table illustrated in FIG. 10.

In the aforementioned example, the TBS translation table illustrated in FIG. 3 and the expanded TBS translation table illustrated in FIG. 10 are used. It, however, goes without saying that even if the two tables are used and combined into one table, it is possible to obtain the same effect as described above.

According to the aforementioned fourth embodiment, it is possible to obtain the new effect in which the radio terminal 20 may appropriately receive the transport block (downlink data), while the various benefits are provided by multi-subframe scheduling and the like, like the first embodiment. In addition, even if a transport block (downlink data) with a large size to which the first embodiment is not applicable is transmitted, the fourth embodiment is applicable and thus has an advantage, like the second embodiment.

Modified Example Related to TBS Index

Various modified examples that are applicable to the aforementioned first to fourth embodiments are described below. The modified examples may be independently applied to each of the embodiments and may be combined and applied to each of the embodiments.

As a first modified example, a modified example related to the TBS index is described. This modified example is applicable to each of the first to fourth embodiments. Although the modified example is applied to the first embodiment as an example, the modified example is applicable to the other embodiments in the same manner as described below.

In the first embodiment, the TBS index is used in the TBS identification process. The TBS index is a parameter coordinating with the radio quality. The radio terminal 20 calculates the TBS index based on the MCS included in the DCI (mapped to the PDCCH) (in S202 and S203 illustrated in FIG. 4) and uses the TBS index in the TBS identification process (in S206). The TBS index or the element of the radio quality may not be used in the techniques disclosed herein. The first modified example in which the TBS index is excluded from the first embodiment is described below.

When the first modified example is applied to the first embodiment, the radio terminal 20 may not calculate the TBS index in S203 illustrated in FIG. 4 and may not use the TBS index in S206 illustrated in FIG. 4. Specifically, in S302 illustrated in FIG. 7 describing the detailed process of S206 illustrated in FIG. 4, the radio terminal 20 calculates the total TBS based on only the number of all RBs without using the TBS index. This calculation may be achieved by fixing the TBS index to a predetermined value in the table illustrated in FIG. 3, for example. Thus, in S302, the radio terminal 20 may calculate the total TBS based on the table illustrated in FIG. 3 from only the number of all the RBs.

Additionally speaking, the TBS index is used for the identification of the TBS in the existing LTE system. In the techniques disclosed herein, however, the TBS index or the element of the radio quality may not be used. Thus, even if the techniques disclosed herein are applied to the LTE system, the element corresponding to the TBS index may be removed as described in the first modified example. In addition, it goes without saying that if the techniques disclosed herein are applied to a radio communication system other than the LTE system, the element of the radio quality that corresponds to the TBS index may be removed.

Modified Example Related to Resource Assignment

As a second modified example, a modified example related to a resource amount (RB size) assigned to each unit radio resource (a single subframe of a single carrier) is described below. The second modified example is applicable to each of the first to fourth embodiments.

In the aforementioned first to fourth embodiments, resource amounts (RB sizes or the numbers of RBs) assigned to unit radio resources are equal to each other. On the other hand, in the second modified example, an RB size to be assigned to each unit radio resource is variable. A case where multi-subframe scheduling is executed on three subframes is described below as an example. For example, RB sizes may be assigned to three subframes to be subjected to multi-subframe scheduling, while the RB sizes are set to be different by a fixed value (of, for example, 5 RBs) or a fixed rate (of, for example, 10%) from each other.

In the fourth embodiment, if the expanded TBS translation table illustrated in FIG. 10 is used, some values (for example, 113 and the like) corresponding to RB sizes are missing from values of the abscissa of FIG. 10. Thus, if the second modified example is applied and the RB sizes are set to be different by the fixed value or the fixed rate from each other, the total RB size of the three subframes may be a value that does not exist in the abscissa of the expanded TBS translation table illustrated in FIG. 10. In order to avoid this, it is desirable that an assignment rule that causes only values existing in the abscissa of the expanded TBS translation table illustrated in FIG. 10 to be assigned be used. For example, if the total RB size when the RB sizes are set to be different by the fixed value or the fixed rate from each other is a value that does not exist in the abscissa of the expanded TBS translation table illustrated in FIG. 10, the RB size of the last subframe among the three subframes may be reduced or increased, and the total RB size may be adjusted to a value existing in the abscissa of the expanded TBS translation table illustrated in FIG. 10.

The adjustment is described based on a specific example using values. For example, the following case is considered: the case where the RB sizes (the numbers of RBs) to be assigned to two subframes that are among the three subframes and exclude the first subframe among the three subframes are reduced by 10% in geometric progression (and rounded down to the nearest whole numbers) and the RB size to be assigned to the first subframe among the three subframes is 42. In this case, the RB size to be assigned to the second subframe is calculated to be 37 based on multiplication of (42×0.9), and the RB size to be assigned to the third subframe is calculated to be 34 based on multiplication (42×0.9$^2$). Thus, the total of the RB sizes assigned to the three subframes is 42+37+34=113 that does not exist in the abscissa of the expanded TBS translation table illustrated in FIG. 10. For example, the RB size to be assigned to the third subframe is reduced by only 1 to 33. In this case, the total RB size assigned to the three subframes is 42+37+33=112 that is a value existing in the abscissa of the expanded TBS translation table illustrated in FIG. 10.

As a use case of the second modified example, it is considered that a smaller RB size is assigned to a later subframe since the effect of the aforementioned adaptive modulation and coding becomes less effective. In the second modified example, it is possible to obtain the effects obtained in the first to fourth embodiments, and radio resources may be practically, flexibly assigned.

Modified Example Related to RB Size

The aforementioned embodiments and the aforementioned modified examples assume that the sizes of RBs to be assigned to unit radio resources (that are each a single subframe of a single carrier) collectively scheduled by multi-subframe scheduling and the like are fixed values or regularly reduced or increased. On the other hand, in another modified example, the sizes of the RBs to be assigned to the unit radio resources collectively scheduled by multi-subframe scheduling and the like may be arbitrary sizes.

This modified example may be achieved by expanding DCI used in multi-subframe scheduling and the like. For example, although conventional DCI format 1 illustrated in FIG. 5 includes a single resource block assignment (RB assignment), DCI format 1 may include multiple resource block assignments (RB assignments) in this modified example. The sizes of the RBs to be assigned to the unit radio resources collectively scheduled by multi-subframe scheduling and the like may be reflected in values of the RB assignments. Thus, not only the sizes of the RBs to be assigned to the unit radio resources may be arbitrary sizes, but also the positions of the RBs to be assigned to the unit radio resources may be arbitrarily set.

According to this modified example, the total of the sizes of the RBs of multiple subframes and the like scheduled by multi-subframe scheduling and the like may be an arbitrary value that is equal to or larger than 110 RBs. Thus, in this modified example, the TBS identification processes described in the embodiments and the first and second modified examples may not be applied, and another TBS identification process is defined.

As an example of the other TBS identification process according to this modified example, it is considered that an expanded translation table in which a value (RB size) is not missing in the abscissa of the expanded translation table is prepared. In this case, however, since the size of the expanded translation table is larger than the expanded translation tables that are exemplified in FIGS. 10 and 11 and in which some values are missing in the abscissas, a larger memory capacity is provided.

As another example of the other TBS identification process according to this modified example, the following method is considered. It is assumed that the total of the sizes of RBs of multiple subframes scheduled by multi-subframe scheduling and the like is S (that is a positive integer exceeding 110). In this case, the radio terminal sets S to be equal to a value of (a+b). In this case, it is assumed that a is a positive integer equal to or smaller than S and is the maximum number among values in the abscissa of the expanded TBS translation table and that b is 0 or a positive integer. The radio terminal may uniquely calculate a and b for the arbitrary value S. Then, the radio terminal may calculate a TBS for the RB size a from the TBS translation table, calculate a TBS for the RB size b from the TBS translation table, and obtain the sum of the values a and b as a TBS for the value S. According to this method, the expanded TBS translation table that is exemplified in FIG. 10 or 11 and in which values are missing from the abscissa may be used and there is an advantage in that a memory capacity for the table is not large.

Another Embodiment

Another embodiment is described below.

The other embodiment in which the techniques disclosed herein are applied to semi-persistent scheduling (SPS) is described. In LTE-A, a scheduling scheme that is referred to as SPS is introduced. SPS is to assign semi-persistent radio resources without dynamically assigning radio resources for each time of transmission in the same manner as normal scheduling. According to SPS, the radio base station may assign cyclic radio resources without transmitting a PDCCH (DCI) and provided for scheduling to the radio terminal for each time of transmission.

In conventional SPS, cyclic radio resources are assigned to a single subframe. It is, however, considered that each cyclic radio resource is assigned to multiple frames. In this case, a single transport block (TB) may be transmitted over multiple frames, and a TBS may not be calculated, like the aforementioned reference technique. This problem may be solved by assigning the techniques disclosed herein to SPS.

A process when the techniques disclosed herein are assigned to SPS is described with reference to FIG. 13. In S601, the radio base station 10 notifies the radio terminal 20 of the number (3 as an example in this case) of packets for 1 TB such as a cycle of SPS or the like. The notification of S601 is achieved by a radio resource control (RRC) signal that is a control signal of Layer 3 (L3). In S602, the radio base station 10 activates SPS. The activation of SPS corresponds to the start of SPS. The radio base station 10 activates SPS by transmitting DCI having a predetermined value set thereto to the radio terminal 20. As the DCI, DCI format 1 illustrated in FIG. 5 may be used, for example. In S604 to S606, the radio base station 10 executes SPS transmission so as to transmit TBs to the radio terminal 20 based on cyclic radio resources. In this case, each TB may be transmitted over three packets in one time of the SPS transmission, and the radio terminal 20 may calculate a TBS based on a TBS identification process based on any of the aforementioned embodiments or any of the aforementioned modified examples. Lastly, in S607, the radio base station 10 releases SPS. The release of SPS corresponds to the termination of SPS. The radio base station 10 releases SPS by transmitting DCI having a predetermined value set thereto to the radio terminal 20. In this manner, the techniques disclosed herein may be applied to SPS.

Next, another embodiment in which the techniques disclosed herein are applied to evolved PDCCHs (EPDCCHs) is described. In LTE-A, the EPDCCHs that are obtained by expanding conventional PDCCHs are introduced. Since the EPDCCHs may be set in data signal regions, an effect of inhibiting a lack of a control signal region or the like is obtained.

Figure 14:
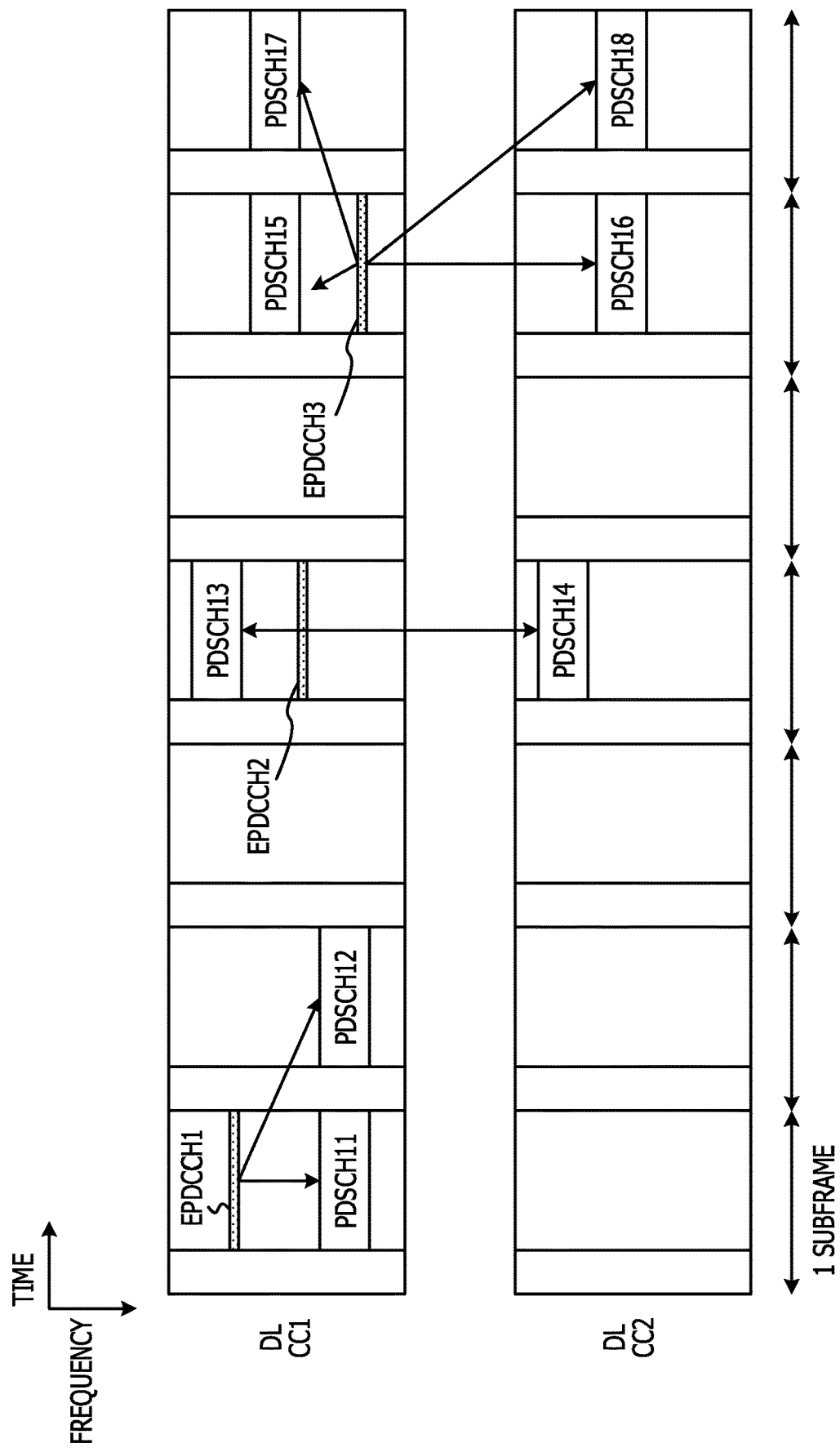
FIG. 14 is a conceptual diagram illustrating a case where the techniques disclosed herein are applied to EPDCCHs.

FIG. 14 is a conceptual diagram illustrating a case where the techniques disclosed herein are assigned to the EPDCCHs. In FIG. 14, three EPDCCHs 1, 2, and 3 are set in data signal regions of subframes. DCI for scheduling is mapped to each of the EPDCCHs in the same manner as normal PDCCHs. The EPDCCHs illustrated in FIG. 14 are used to execute multi-subframe scheduling and the like to schedule PDSCHs. Specifically, the EPDCCH 1 is used to execute multi-subframe scheduling to schedule PDSCHs 11 and 12 in two subframes. The EPDCCH 2 is used to execute multi-carrier scheduling to schedule PDSCHs 13 and 14 on two carriers. The EPDCCH 3 is used to execute multi-subframe scheduling and multi-carrier scheduling to schedule PDSCHs 15, 16, 17, and 18 in two subframes on two carriers.

When the scheduling is executed in the aforementioned manner, a single TB may be transmitted over multiple frames. Thus, a TBS may not be calculated, like the aforementioned reference technique. This problem is solved by assigning the techniques disclosed herein to EPDCCHs. Specifically, even when the techniques disclosed herein are assigned to the EPDCCHs, the radio terminal 20 may calculate a TBS by a TBS identification process based on any of the aforementioned embodiments or any of the aforementioned modified examples. A detailed description is duplicated with the above description and omitted.

In the example illustrated in FIG. 14, PDSCHs are allocated to subframes to which the EPDCCHs are allocated. The PDSCHs may be allocated to only subframes succeeding the subframes to which the EPDCCHs are allocated. In the example illustrated in FIG. 14, resource blocks to which the EPDCCHs are allocated are not used as PDSCHs. If the PDSCHs are allocated to only the subframes succeeding the subframes to which the EPDCCHs are allocated, the PDSCHs may be allocated to arbitrary resource blocks.

Lastly, an embodiment in which the techniques disclosed herein are applied to a carrier segment is described. For LTE-A, a concept that is referred to as the carrier segment has been studied as a modified example of carrier aggregation. The carrier segment is a frequency component to be added to a currently existing carrier.

Figure 15:
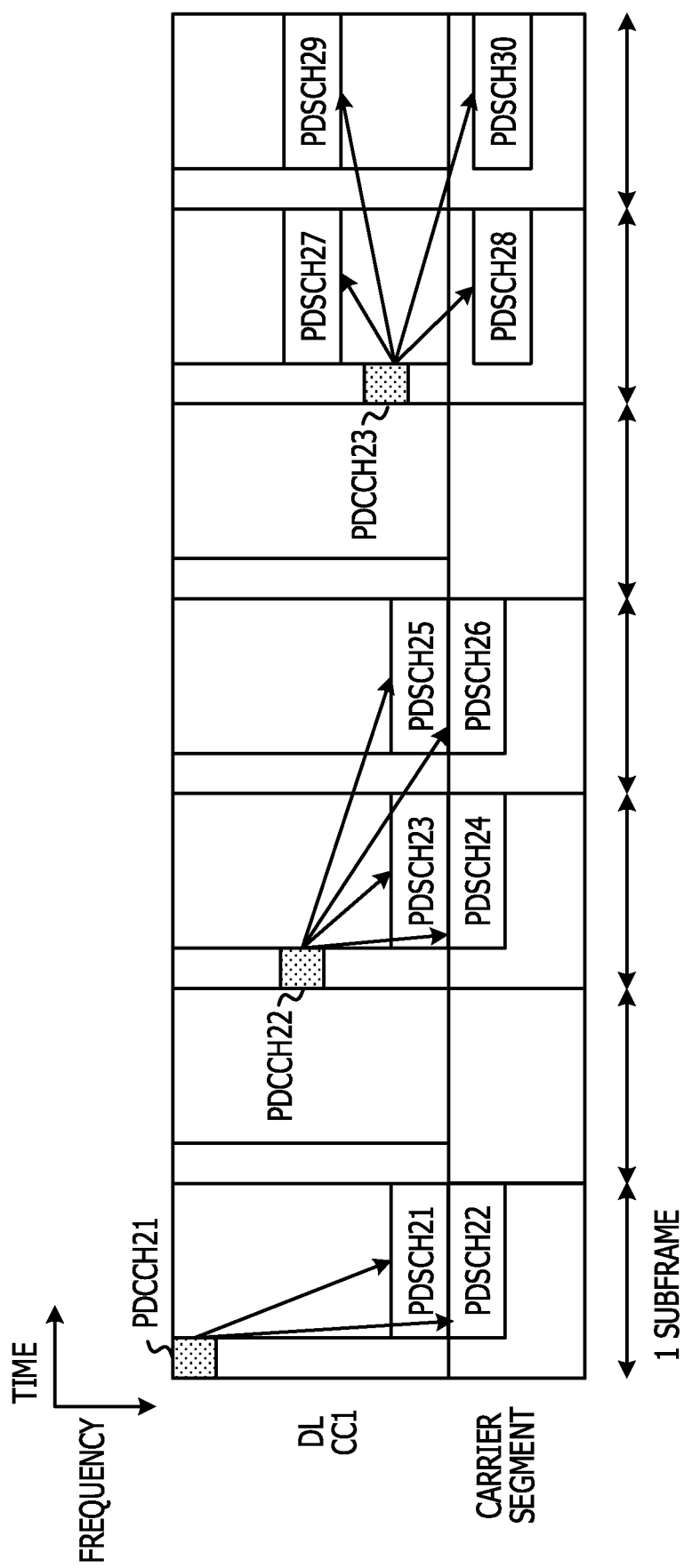
FIG. 15 is a conceptual diagram illustrating a case where the techniques disclosed herein are applied to a carrier segment.

FIG. 15 is a conceptual diagram illustrating a case where the techniques disclosed herein are applied to the carrier segment. In FIG. 15, the carrier segment is added to a single carrier CC1. PDCCHs illustrated in FIG. 15 are used to execute multi-subframe scheduling and the like to schedule PDSCHs. In this case, multi-subframe scheduling and the like include scheduling to be executed to schedule PDSCHs on the carrier and the carrier segment. Specifically, a PDCCH 21 is used to schedule PDSCHs 21 and 22 on the carrier and the carrier segment. In addition, a PDCCH 22 is used to execute multi-subframe scheduling to schedule PDSCHs 23, 24, 25, and 26 on the carrier and the carrier segment in two subframes. A PDCCH 23 is used to execute multi-subframe scheduling to schedule PDSCHs 27, 28, 29, and 30 on the carrier and the carrier segment in two subframes in the same manner as the PDCCH 22.

It is considered that when the carrier segment is introduced, the number of resource blocks to be assigned to each subframe exceeds 110. Even in this case, a TBS may be calculated using any of the expanded TBS translation tables described in the fourth embodiment, for example. Since it is considered that when the carrier segment is introduced, the number of resource blocks to be assigned to each subframe exceeds 110, it is sufficient if the abscissa (candidates for the number of resource blocks to be assigned) of the expanded translation table indicates values that are values 111 to 120 (if the maximum value of the number of resource blocks to be assigned to each subframe is increased to 120 due to the addition of the carrier segment) and values exceeding 120 and obtained by multiplying values 1 to 120 by an integer satisfying the predetermined requirement. FIG. 15 illustrates the case where the beginnings (symbols corresponding to the PDCCHs of the carrier CC1) of subframes are not used as PDSCHs. It is, however, considered that a PDCCH is not allocated to the carrier segment. Thus, the symbols at the beginnings of the subframes may be used as PDSCHs on the carrier segment.

Figure 16:
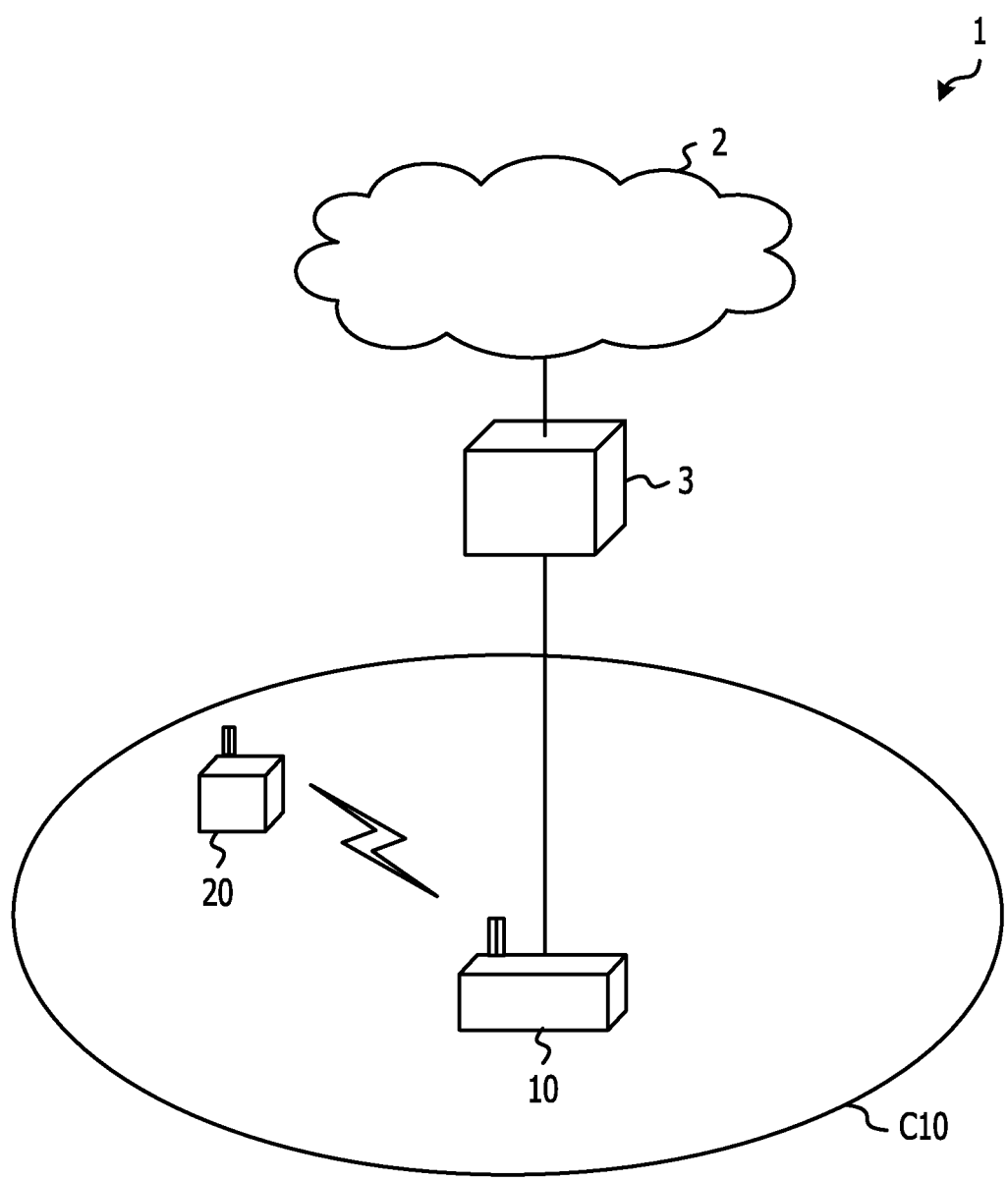
FIG. 16 is a diagram illustrating an example of a network configuration of a radio communication system according to the embodiments.

Network Configuration of Radio Communication System According to Each Embodiment Next, a network configuration of the radio communication system according to each embodiment is described with reference to FIG. 16. As illustrated in FIG. 16, the radio communication system 1 includes the radio base station 10 and the radio terminal 20. The radio base station 10 forms a cell C10. The radio terminal 20 exists in the cell C10. In this specification, the radio base station 10 is referred to as a "transmitting station" in some cases, and the radio terminal 20 is referred to as a "receiving station" in some cases.

The radio base station 10 is connected to a network device 3 through a wired connection. The network device 3 is connected to a network 2 through a wired connection. The radio base station 10 may transmit and receive data and control information to and from another radio base station through the network device 3 and the network 2.

The radio base station 10 may be separated from a function of executing radio communication with the radio terminal 20, digital signal processing, and a control function, while the radio communication function, the digital signal processing, and the control function may be included in devices that are separated from the radio base station 10. In this case, a device that includes the radio communication function is referred to as a remote radio head (RRH), and a device that includes the digital signal processing and the control function is referred to as a base band unit (BBU). The RRH may be installed outside the BBU and connected to the BBU through an optical fiber or the like. In addition, the radio base station 10 may be a small radio base station such as a macro radio base station, a pico radio base station, a micro radio base station, or a femto radio base station or may be any of radio base stations of various sizes. If a relay station that relays radio communication between the radio base station 10 and the radio terminal 20 is used, the relay station (enabling the transmission to the radio terminal 20, the reception from the radio terminal 20, and the control of the radio terminal 20) may be included in the radio base station 10 described in this specification.

The radio terminal 20 wirelessly communicates with the radio base station 10.

The radio terminal 20 may be a mobile phone device, a smartphone, a personal digital assistant (PDA), a personal computer, or a radio terminal such as any of various devices provided with a radio communication function or equipment (sensor devices and the like) provided with a radio communication function. In addition, if the relay station that relays radio communication between the radio base station 10 and the radio terminal 20 is used, the relay station (enabling the transmission to the radio base station 10, the reception from the radio base station 10, and the control of the radio base station 10) may be included in the radio terminal 20 described in this specification.

The network device 3 includes a communication unit and a controller, for example. The constituent parts of the network device 3 are connected to each other so as to able to transmit and receive a signal and data in one direction or both directions. The network device 3 is achieved by a gateway, for example. In a hardware configuration of the network device 3, the communication unit is achieved by an interface circuit and the controller is achieved by a processor and a memory, for example.

Specific forms of the separation and integration of the constituent elements of the radio base station and radio terminal are not limited to the forms described in the first embodiment, and all or a part of the constituent elements may be functionally or physically separated or integrated on an arbitrary basis based on loads of the elements and usage statuses of the elements. For example, memories may be connected through networks or cables to the radio base station and the radio terminal as external devices of the radio base station and radio terminal.

Functional Configurations of Devices of Radio Communication System According to Each Embodiment Next, functional configurations of the devices of the radio communication system according to each embodiment are described with reference to FIGS. 17 and 18.

Figure 17:
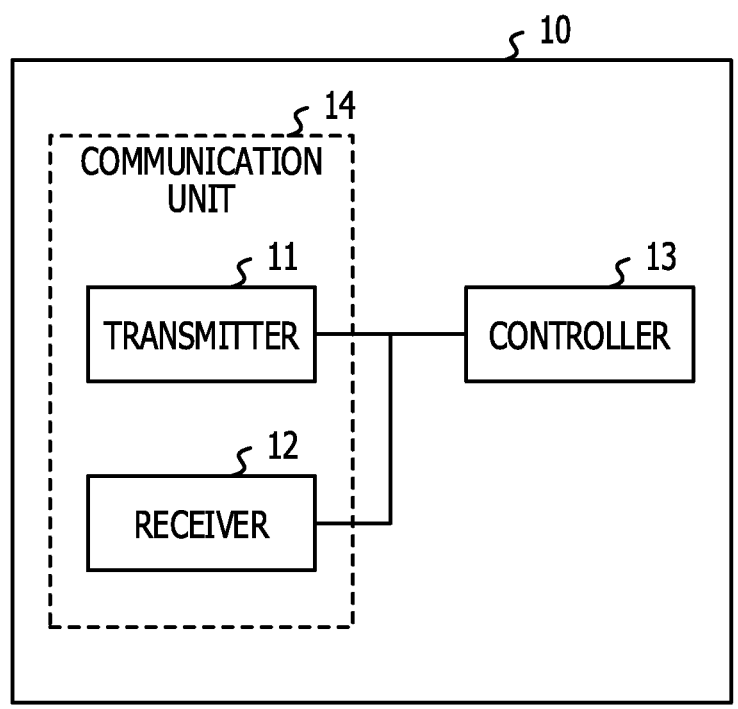
FIG. 17 is a diagram illustrating an example of a functional configuration of a radio base station included in the radio communication system according to the embodiments.

FIG. 17 is a functional block diagram illustrating a configuration of the radio base station 10. As illustrated in FIG. 17, the radio base station 10 includes a transmitter 11, a receiver 12, and a controller 13. The constituent parts of the radio base station 10 are connected to each other so as to able to transmit and receive a signal and data in one direction or both directions. The transmitter 11 and the receiver 12 are collectively referred to as a communication unit 14.

The transmitter 11 transmits a data signal and a control signal through an antenna by radio communication. The antenna may be common to transmission and reception. The transmitter 11 transmits downlink signals through a downlink data channel and a downlink control channel, for example. The downlink data channel includes a physical downlink shared channel (PDSCH), for example. The downlink control channel includes a physical downlink control channel (PDCCH), for example. The signals to be transmitted include an L1/L2 control signal to be transmitted on the control channel to the radio terminal 20 in a connected state, a user data signal to be transmitted on the data channel to the radio terminal 20 in the connected state, and a radio resource control (RRC) signal. In addition, the signals to be transmitted include reference signals to be used for channel estimation and demodulation, for example.

Figure 13:
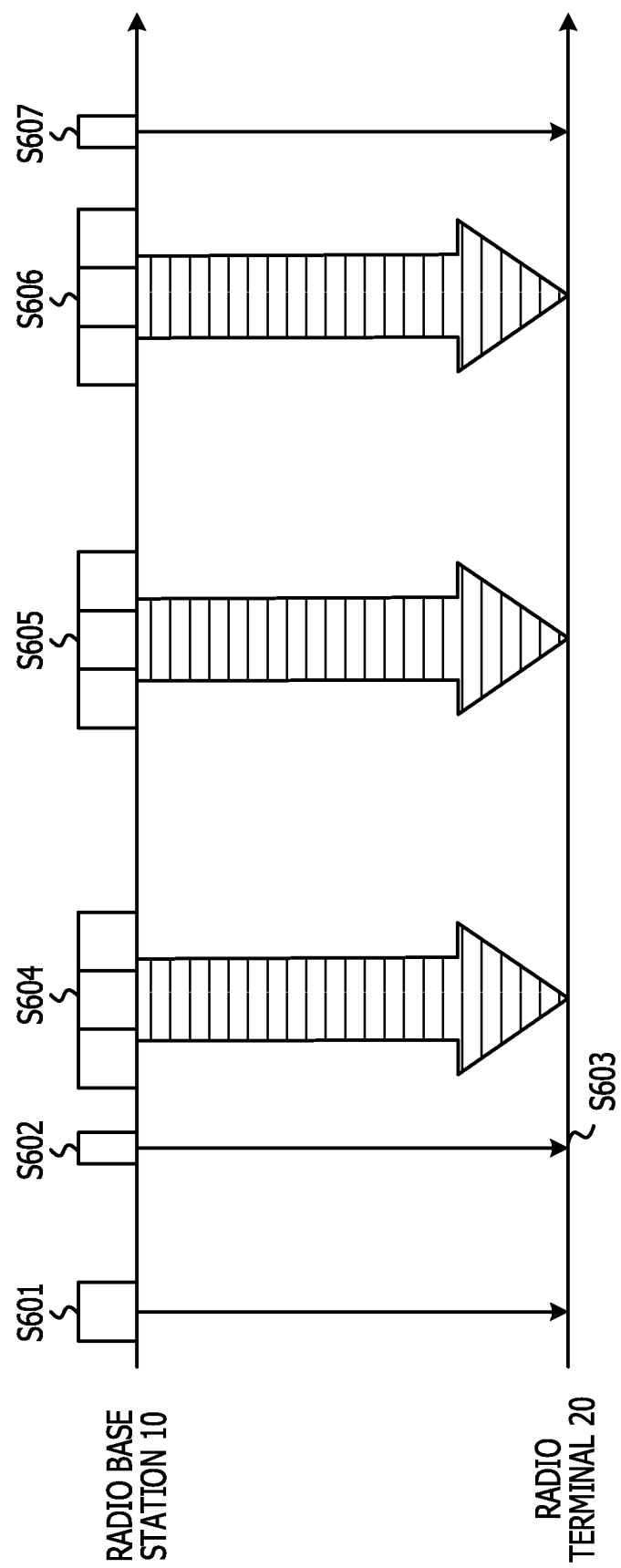
FIG. 13 is a conceptual diagram illustrating a case where the techniques disclosed herein are applied to SPS.

Examples of the signals to be transmitted by the transmitter 11 are signals to be transmitted by the radio base station 10 in the cases illustrated in FIGS. 4 and 13 and the like. Specifically, the transmitter 11 may transmit data through the PDCCH in S201 illustrated in FIG. 4 and transmit data through the PDSCHs in S204. In addition, the transmitter 11 may transmit signals in S601 to S607 illustrated in FIG. 13. The signals to be transmitted by the transmitter 11 are not limited to them and may include all the signals to be transmitted by the radio base station 10 in the aforementioned embodiments and the aforementioned modified examples.

The receiver 12 receives a data signal and control signal transmitted by the radio terminal 20 through the antenna by first radio communication. The receiver 12 receives uplink signals through an uplink data channel and an uplink control channel, for example. The uplink data channel includes a physical uplink shared channel (PUSCH), for example. The uplink control channel includes a physical uplink control channel (PUCCH), for example. The signals to be received include an L1/L2 control signal transmitted on the control channel from the radio terminal 20 in the connected state, a user data signal transmitted on the data channel from the radio terminal 20 in the connected state, and a radio resource control (RRC) signal, for example. In addition, the signals to be received include reference signals to be used for channel estimation and demodulation, for example.

Examples of the signals to be received by the receiver 12 are signals to be received by the radio base station 10 in the case illustrated in FIG. 4. Specifically, the receiver 12 may receive an ACK or NACK signal in S210 illustrated in FIG. 4. The signals to be received by the receiver 12 are not limited to them and may include all the signals to be received by the radio base station 10 in the aforementioned embodiments and the aforementioned modified examples.

The controller 13 outputs, to the transmitter 11, data to be transmitted and control information to be transmitted. The controller 13 receives data received by the receiver 12 and control information received by the receiver 12. The controller 13 acquires data and control information from the network device 3 or another radio base station through a wired connection or a wireless connection. The controller 13 executes various types of control related to various signals to be transmitted by the transmitter 11 and related to various signals received by the receiver 12.

Specific examples of processes to be controlled by the controller 13 are processes to be executed by the radio base station 10 in the cases illustrated in FIGS. 4 and 13. Specifically, the controller 13 may control the PDCCH transmission of S201 illustrated in FIG. 4, the PDSCH transmission of S204, and processes related to ACK or NACK reception in S210. In addition, the controller 13 may control processes related to the transmission of signals in S601 to S607 illustrated in FIG. 13. The processes to be controlled by the controller 13 are not limited to them and may include all the processes to be executed by the radio base station 10 in the aforementioned embodiments and the aforementioned modified examples.

Figure 18:
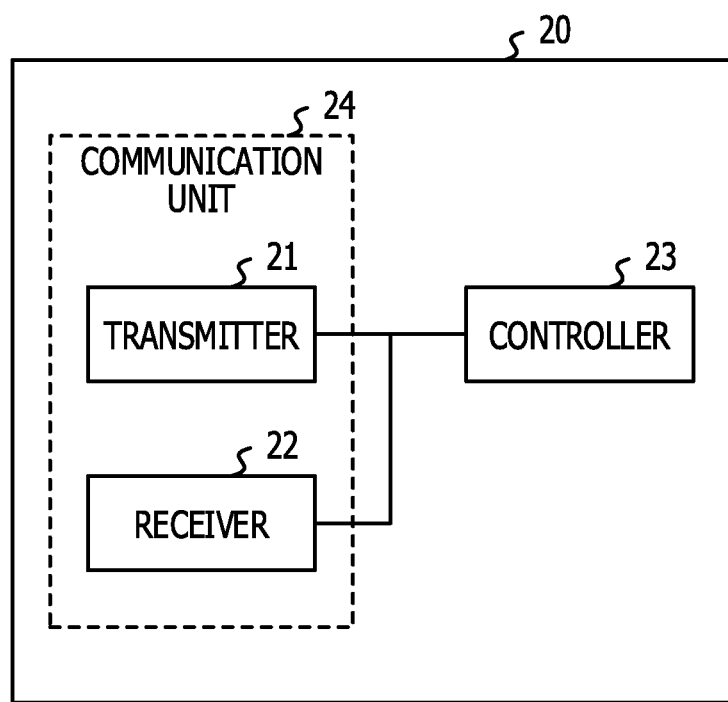
FIG. 18 is a diagram illustrating an example of a functional configuration of a radio terminal included in the radio communication system according to the embodiments.

FIG. 18 is a functional block diagram illustrating a configuration of the radio terminal 20. As illustrated in FIG. 18, the radio terminal 20 includes a transmitter 21, a receiver 22, and a controller 23. The constituent parts of the radio terminal 20 are connected to each other so as to able to transmit and receive a signal and data in one direction or both directions. The transmitter 21 and the receiver 22 are collectively referred to as a communication unit 24.

The transmitter 21 transmits a data signal and a control signal through an antenna by radio communication. The antenna may be common to transmission and reception. The transmitter 21 transmits uplink signals through an uplink data channel and an uplink control channel, for example. The uplink data channel includes a physical uplink shared channel (PUSCH), for example. The uplink control channel includes a physical uplink control channel (PUCCH), for example. The signals to be transmitted include an L1/L2 control signal to be transmitted on the control channel to the radio base station 10 connected to the radio terminal 20, a user data signal to be transmitted on the data channel to the base station 10 connected to the radio terminal 20, and a radio resource control (RRC) signal. In addition, the signals to be transmitted include reference signals to be used for channel estimation and demodulation, for example.

Specific examples of the signals to be transmitted by the transmitter 21 are the signals to be transmitted by the radio terminal 20 in the case illustrated in FIG. 4. Specifically, the transmitter 21 may transmit an ACK or NACK signal in S210 illustrated in FIG. 4. The signals to be transmitted by the transmitter 21 are not limited to them and may include all the signals to be transmitted by the radio terminals 20 in the aforementioned embodiments and the aforementioned modified examples.

The receiver 22 receives a data signal and control signal transmitted by the radio base station 10 through the antenna by radio communication. The receiver 22 receives downlink signals through a downlink data channel and a downlink control channel. The downlink data channel includes a physical downlink shared channel (PDSCH), for example. The downlink control channel includes a physical downlink control channel (PDCCH), for example. The signals to be received include an L1/L2 control signal transmitted on the control channel from the radio base station 10 connected to the radio terminal 20, a user data signal transmitted on the data channel from the radio base station 10 connected to the radio terminal 20, and a radio resource control (RRC) signal. In addition, the signals to be received include reference signals to be used for channel estimation and demodulation.

Specific examples of the signals to be received by the receiver 22 are the signals to be received by the radio terminal 20 in the cases illustrated in FIGS. 4 and 13. Specifically, the receiver 22 may receive data through the PDCCH in S201 illustrated in FIG. 4 and may receive data through the PDSCHs in S204. In addition, the receiver 22 may receive the signals in S601 to S607 illustrated in FIG. 13. The signals to be received by the receiver 22 are not limited to them and may include all the signals to be received by the radio terminal 20 in the aforementioned embodiments and the aforementioned modified examples.

The controller 23 outputs, to the transmitter 21, data to be transmitted and control information to be transmitted. The controller 23 receives data received by the receiver 22 and control information received by the receiver 22. The controller 23 acquires data and control information through a wired connection or a wireless connection from the network device 3 or another radio base station. The controller 23 executes various types of control related to various signals to be transmitted by the transmitter 21 and related to various signals received by the receiver 22.

Specific examples of processes to be controlled by the controller 23 are the processes to be executed by the radio terminal 20 in the cases illustrated in FIGS. 4, 7, 8, 9, 12, and 13. Specifically, the controller 23 may control the PDCCH reception of S201 illustrated in FIG. 4, the parameter extraction of S202, the parameter interpretation of S203, the PDSCH reception of S204, the determination of S205, the TBS identification process of S206, the derate matching of S207, the turbo decoding of S208, the CRC checking of S209, and the ACK or NACK transmission of S210. In addition, the controller 23 may control the processes illustrated in FIGS. 7, 8, 9, and 12. The controller 23 may control the processes related to the reception of the signals in S601 to S607 illustrated in FIG. 13. The processes to be controlled by the controller 23 are not limited to them and may include all the processes to be executed by the radio terminal 20 in the aforementioned embodiments and the aforementioned modified examples.

Hardware Configuration of Devices of Radio Communication System According to Each Embodiment Hardware configurations of the devices included in the radio communication system according to each embodiment and each modified example are described with reference to FIGS. 19 and 20.

Figure 19:
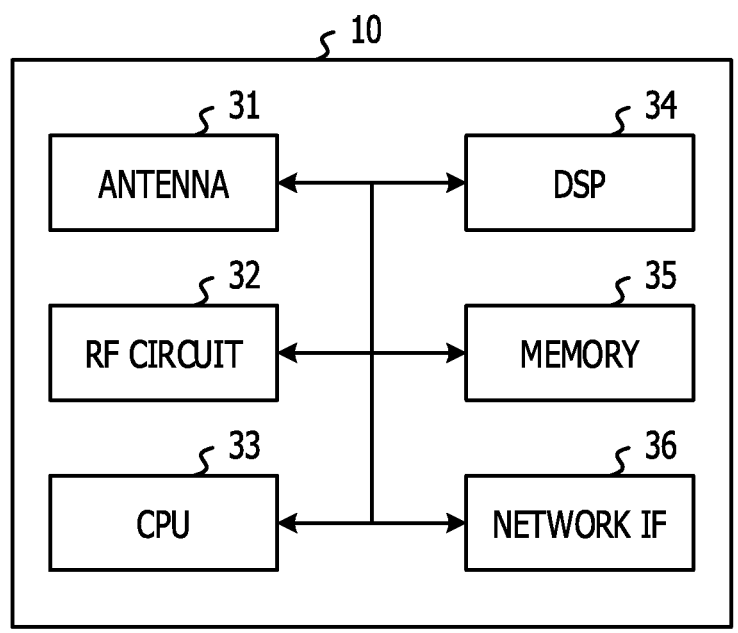
FIG. 19 is a diagram illustrating an example of a hardware configuration of the radio base station included in the radio communication system according to the embodiments.

FIG. 19 is a diagram illustrating the hardware configuration of the radio base station 10. As illustrated in FIG. 19, the radio base station 10 includes, as hardware constituent elements, a radio frequency (RF) circuit 32 provided with an antenna 31, a central processing unit (CPU) 33, a digital signal processor (DSP) 34, a memory 35, and a network interface (IF) 36, for example. The CPU 33 is connected to the other constituent elements through a bus so as to able to transmit and receive various signals and data to and from the other constituent elements. The memory 35 includes at least any of a random access memory (RAM) such as a synchronous dynamic random access memory (SDRAM), a read only memory (ROM), and a flash memory and stores a program, control information, and data.

Correspondences between the functional configuration of the radio base station 10 illustrated in FIG. 17 and the hardware configuration of the radio base station 10 illustrated in FIG. 19 are described below. The transmitter 11 and the receiver 12 (or the communication unit 14) are achieved by the RF circuit 32 or the antenna 31 and the RF circuit 32, for example. The controller 21 is achieved by the CPU 33, the DSP 34, the memory 35, a digital electronic circuit (not illustrated), and the like, for example. Examples of the digital electronic circuit are an application specific integrated circuit (ASIC), a field-programming gate array (FPGA), and a large-scale integrated (LSI) circuit.

Figure 20:
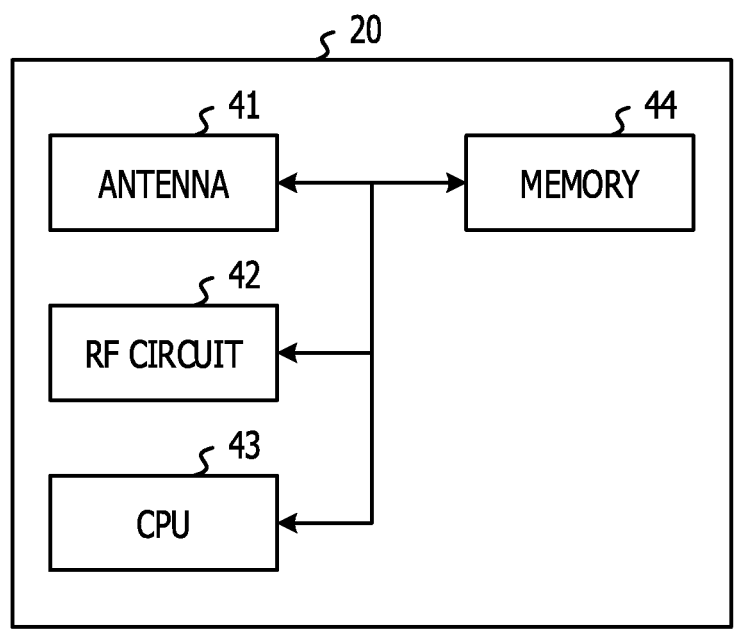
FIG. 20 is a diagram illustrating an example of a hardware configuration of the radio terminal included in the radio communication system according to the embodiments.

FIG. 20 is a diagram illustrating the hardware configuration of the radio terminal 20. As illustrated in FIG. 20, the radio terminal 20 includes, as hardware constituent elements, an RF circuit 42 provided with an antenna 41, a CPU 43, and a memory 44, for example. The radio terminal 20 may include a display device connected to the CPU 43, and the display device is a liquid crystal display or the like. The memory 44 includes at least any of a RAM such as a SDRAM, a ROM, and a flash memory and stores a program, control information, and data.

Correspondences between the functional configuration of the radio terminal 20 illustrated in FIG. 18 and the hardware configuration of the radio terminal 20 illustrated in FIG. 20 are described below. The transmitter 21 and the receiver 22 (or the communication unit 24) are achieved by the RF circuit 42 or the antenna 41 and the RF circuit 42, for example. The controller 23 is achieved by the CPU 43, the memory 44, a digital electronic circuit (not illustrated), and the like, for example. Examples of the digital electronic circuit are an ASIC, an FPGA, and an LSI circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a first apparatus configured to perform a transmission by using one or more of radio resources each of which has a frequency band and a time period; and
   a second apparatus configured to store a plurality of correspondence information each of which indicates a correspondence between a resource amount and a data size, the data size indicating size of data able to be transmitted based on the resource amount, the resource amount being any of a plurality of resource amounts to be assigned to the one or more of radio resources by the first apparatus,
   wherein the first apparatus is configured to transmit data that is mapped to the one or more of radio resources, in either or both of a first manner and a second manner, the first manner being a manner where the first apparatus transmits a single control signal associated with the data to be transmitted across a plurality of time resource, the second manner being a manner where the first apparatus transmits a single control signal associated with the data to be transmitted across a plurality of frequency resource,
   wherein the single control signal includes first information, the first information indicating a value based on either or both of a number of the plurality of time resources in the first manner and a number of the plurality of frequency resources in the second manner,
   wherein the second apparatus is configured to
     acquire a first data size corresponding to a size of data transmitted from the first apparatus, the first data size being dependent on the value indicated by the first information in the single control signal, and the plurality of correspondence information, and
     decode the data from the first apparatus in accordance with the first data size.

2. A method for wireless communication, the method comprising:
   in a wireless communication system including a first apparatus configured to perform a transmission by using one or more of radio resources each of which has a frequency band and a time period; and a second apparatus configured to store a plurality of correspondence information each of which indicates a correspondence between a resource amount and a data size, the data size indicating size of data able to be transmitted based on the resource amount, the resource amount being any of a plurality of resource amounts to be assigned to the one or more of radio resources by the first apparatus,
   by the first apparatus,
     transmitting data that is mapped to the one or more of radio resources, in either or both of a first manner and a second manner, the first manner being a manner where the first apparatus transmits a single control signal associated with the data to be transmitted across a plurality of time resource, the second manner being a manner where the first apparatus transmits a single control signal associated with the data to be transmitted across a plurality of frequency resource, wherein the single control signal includes first information, the first information indicating a value based on either or both of a number of the plurality of time resources in the first manner and a number of the plurality of frequency resources in the second manner, by the second apparatus, acquiring a first data size corresponding to a size of data transmitted from the first apparatus, the first data size being dependent on the value indicated by the first information in the single control signal, and the plurality of correspondence information, and decoding the data from the first apparatus in accordance with the first data size.

3. A second apparatus configured to wirelessly communicate with a first apparatus which configured to perform a transmission by using one or more of radio resources each of which has a frequency band and a time period, wherein the second apparatus comprises:

a memory configured to store a plurality of correspondence information each of which indicates a correspondence between a resource amount and a data size, the data size indicating size of data able to be transmitted based on the resource amount, the resource amount being any of a plurality of resource amounts to be assigned to the one or more of radio resources by the first apparatus, a processing circuitry coupled to the memory and configured to receive a single control signal and the data from the first apparatus, the data being mapped to the one or more of radio resources by either or both of a first manner and a second manner, the first manner being a manner where the first apparatus transmits a single control signal associated with the data to be transmitted across a plurality of time resource, the second manner being a manner where the first apparatus transmits a single control signal associated with the data to be transmitted across a plurality of frequency resource, wherein the single control signal includes first information, the first information indicating a value based on either or both of a number of the plurality of time resources in the first manner and a number of the plurality of frequency resources in the second manner, acquire a first data size corresponding to a size of data transmitted from the first apparatus, the first data size being dependent on the value indicated by the first information in the single control signal, and the plurality of correspondence information, and decode the data from the first apparatus in accordance with the first data size.

4. A first apparatus configured to perform a transmission by using one or more of radio resources each of which has a frequency band and a time period, wherein the first apparatus comprises:

a processing circuitry configured to transmit data to a second apparatus configured to store a plurality of correspondence information each of which indicates a correspondence between a resource amount and a data size, the data size indicating size of data able to be transmitted based on the resource amount, the resource amount being any of a plurality of resource amounts to be assigned to the one or more of radio resources by the first apparatus, wherein the data is mapped to the one or more of radio resources, in at least one of a first manner and a second manner, the first manner being a manner where the first apparatus transmits a single control signal associated with the data to be transmitted across a plurality of time resources, the second manner being a manner where the first apparatus transmits a single control signal associated with the data to be transmitted across a plurality of frequency resources, wherein the single control signal includes first information, the first information indicating a value based on at least one of a number of the plurality of time resources in the first manner and a number of the plurality of frequency resources in the second manner, wherein the second apparatus acquires a first data size corresponding to a size of data transmitted from the first apparatus, the first data size being dependent on the value indicated by the first information in the single control signal.

* * * * *